(12) United States Patent
Sugimura et al.

(10) Patent No.: US 10,464,487 B2
(45) Date of Patent: Nov. 5, 2019

(54) VIEW ANGLE ADJUSTMENT MECHANISM IN VIEW DEVICE

(71) Applicant: MURAKAMI CORPORATION, Shizuoka (JP)

(72) Inventors: Naomi Sugimura, Shimada (JP); Yasushi Kobayashi, Fujieda (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 15/469,802

(22) Filed: Mar. 27, 2017

(65) Prior Publication Data

US 2017/0282805 A1  Oct. 5, 2017

(30) Foreign Application Priority Data

Mar. 31, 2016  (JP) .................................. 2016-071699

(51) Int. Cl.
*B60R 1/07* (2006.01)
*B60R 1/072* (2006.01)
*B60R 1/02* (2006.01)

(52) U.S. Cl.
CPC .............. *B60R 1/072* (2013.01); *B60R 1/025* (2013.01); *B60R 1/02* (2013.01); *B60R 1/07* (2013.01)

(58) Field of Classification Search
CPC ........... B60R 1/0617; B60R 1/02; B60R 1/06; B60R 1/062; B60R 1/064; B60R 1/072; B60R 1/066; B60R 1/08; B60R 1/0602; B60R 1/1207; B60R 1/025; B60R 1/2665; B60R 1/07; B60R 2001/1215; B60R 2001/1223; B60R 1/04; G02B 7/182; G08B 21/00

(Continued)

(56) References Cited

U.S. PATENT DOCUMENTS

2008/0043354 A1\* 2/2008 Fukai .................... B60R 1/072
                                                    359/877
2009/0309003 A1\* 12/2009 Ohashi .................... B60R 1/04
                                                    248/484

(Continued)

FOREIGN PATENT DOCUMENTS

JP  2005-280500   10/2005
JP  2006-96115    4/2006

(Continued)

*Primary Examiner* — Jade R Chwasz
*Assistant Examiner* — Rahman Abdur
(74) *Attorney, Agent, or Firm* — Greenblum & Bernstein, P.L.C.

(57) ABSTRACT

This invention relates to a view angle adjustment mechanism that causes a view element tilting section holding a view element to be supported by a tilting support section via a plurality of concentric pivots having different diameters, to perform view angle adjustment. An inner pivot is assembled by forcible fitting using elasticity of either or both of a pivot convex and a pivot concave without screw fastening. An outer pivot includes a plurality of elastic pieces disposed at a plurality of positions in a circumferential direction of a curved surface of either or each of both of an outer-pivot convex surface and an outer-pivot concave surface. The outer pivot is assembled by the forcible fitting in the inner pivot. The assembly causes the plurality of elastic pieces to elastically abut on an opposed curved surface.

5 Claims, 16 Drawing Sheets

(58) Field of Classification Search
USPC ........ 359/871, 841–844, 872–877, 850, 881,
359/865, 882; 248/479, 481, 485, 480,
248/495
See application file for complete search history.

(56) References Cited

U.S. PATENT DOCUMENTS

2012/0170146 A1\* 7/2012 Chino ..................... B60R 1/072
359/872
2016/0264055 A1\* 9/2016 Chong .................... B60R 1/072

FOREIGN PATENT DOCUMENTS

JP          2015-202801        11/2015
JP           2015202801  A  \*  11/2015

\* cited by examiner

VIEW ANGLE ADJUSTMENT MECHANISM IN VIEW DEVICE

The disclosure of Japanese Patent Application No. JP2016-071699 filed on Mar. 31, 2016 including the specification, drawings, claims and abstract is incorporated herein by reference in its entirety.

BACKGROUND OF THE INVENTION

Field of the Invention

This invention relates to a view angle adjustment mechanism in a view device including a view element such as a mirror or a camera. In this view angle adjustment mechanism, a view element tilting section holding the view element is supported by a tilting support section via a plurality of concentric pivots having different diameters (that is, sharing a common center and having different diameters) to perform view angle adjustment (view direction adjustment). The view angle adjustment mechanism of this invention enhances an effect of suppressing element vibration (vibration of the view element).

Description of the Related Art

As one kind of view devices, there is a mirror device for a vehicle. As a mirror surface angle adjustment mechanism (view angle adjustment mechanism) in a mirror device for a vehicle, there is one that causes a mirror tilting section (view element tilting section) to be supported by a tilting support section via a plurality of concentric pivots having different diameters to perform mirror surface angle adjustment (view angle adjustment). In comparison with a mirror surface angle adjustment mechanism that causes a mirror tilting section to be supported by a tilting support section via only a single pivot at a center of a mirror surface to perform mirror surface angle adjustment, this mirror surface angle adjustment mechanism provides an effect of suppressing mirror surface vibration (what is called chatter vibration) (element vibration) caused by, e.g., a wind generated by movement of the vehicle or vibration of the vehicle (due to, e.g. road unevenness or engine vibration). As conventional mirror surface angle adjustment mechanisms that cause a mirror tilting section to be supported by a tilting support section via a plurality of concentric pivots having different diameters to perform mirror surface angle adjustment, there are those described in Japanese Patent Laid-Open Nos. 2006-096115, 2005-280500 and 2015-202801. In each of these conventional mirror surface angle adjustment mechanisms, the inner pivot is assembled by screw fastening.

According to each of the mirror surface angle adjustment mechanisms described in Japanese Patent Laid-Open Nos. 2006-096115, 2005-280500 and 2015-202801, the inner pivot is assembled by screw fastening, and thus, once the inner pivot is assembled, the mirror tilting section has no room to move in a surface direction or an axial direction relative to the tilting support section. Thus, if the inner pivot has poor dimension accuracy, support of the outer pivot becomes non-uniform in a circumferential direction upon screw fastening, which may result in insufficiency of the vibration suppression effect.

This invention is intended to solve the aforementioned problem in the conventional techniques and enhance an element vibration suppression effect in a view angle adjustment mechanism that causes a view element tilting section holding a view element such as a mirror or a camera to be supported by a tilting support section via a plurality of concentric pivots having different diameters to perform view angle adjustment.

SUMMARY OF THE INVENTION

A view angle adjustment mechanism in a view device according to this invention is configured to support a view element tilting section holding a view element by a tilting support section via at least two concentric pivots having different diameters, the pivots including an inner pivot and an outer pivot, so as to be capable of adjusting a view angle of the view element, wherein: the inner pivot is assembled by forcible fitting using elasticity of either or both of a pivot convex and a pivot concave without screw fastening; the outer pivot includes a plurality of elastic pieces disposed at a plurality of positions in a circumferential direction of a curved surface of either or each of an outer-pivot convex surface and an outer-pivot concave surface; and the outer pivot is assembled by the forcible fitting in the inner pivot and the plurality of elastic pieces elastically abut on an opposed curved surface. According to this invention, the inner pivot is assembled by forcible fitting using elasticity of one or both of the pivot convex and the pivot concave without screw fastening, and thus, elasticity of the inner pivot causes support of the view element tilting section by the outer pivot to be uniformized in a circumferential direction of the outer pivot. As a result, an element vibration suppression effect provided by the outer pivot is enhanced. In other words, if the support of the view element tilting section by the outer pivot is biased in the circumferential direction of the outer pivot, a pressing force generated by the bias acts on and thereby elastically deforms the inner pivot. As a result, the bias is corrected, and the support of the view element tilting section by the outer pivot is uniformized in the circumferential direction of the outer pivot, providing an element vibration suppression effect.

In this invention, the elastic pieces may be formed in a cantilever-supported manner by cutting the curved surface of either or each of the outer-pivot convex surface and the outer-pivot concave surface. Accordingly, the elastic pieces can easily be disposed at either or each of the outer-pivot convex surface and the outer-pivot concave surface. The elastic pieces may be disposed at five or more positions equally spaced in the circumferential direction of the curved surface at which the elastic pieces are disposed. Accordingly, even if a support failure occurs in one elastic piece, a half or more of a circumference of the opposed curved surface can be supported by the remaining elastic pieces, and thus, extreme decrease in performance of the support of the view element tilting section by the outer pivot is prevented.

In this invention, each of the elastic pieces may include a protrusion protruding toward the opposed curved surface and abut on the opposed curved surface via the protrusion. Accordingly, the elastic pieces abut on the opposed curved surface by means of point contact via the protrusion, and thus, compared to the case where the elastic pieces abut to the opposed curved surface by means of surface contact, slide resistance between the elastic pieces and the opposed curved surface can be reduced, and the slide resistance can be made constant by absorption of piece-to-piece variations (molding errors).

In this invention, at least one of the pivot convex and the pivot concave may be circumferentially divided by a slit formed in an axial direction in at least one of the pivot convex and the pivot concave. Accordingly, the slit makes elastic deformation of at least one of the pivot convex and the pivot concave easy, enabling provision of forcible fitting with less backlash. Also, since elastic deformation of at least one of the pivot convex and the pivot concave is easy, the elasticity of the inner pivot uniformizes the support of the view element tilting section by the outer pivot in the circumferential direction of the outer pivot. As a result, the element vibration suppression effect provided by the outer pivot is enhanced.

BRIEF DESCRIPTION OF THE DRAWINGS

FIG. 22 illustrates a state in which the mirror tilting section 14 is tilted to a maximum angle position in the left direction (state in FIG. 6);

FIG. 23 is a cross-sectional view illustrating a state in which the mirror tilting section 14 is tilted slightly in the right direction subsequent to the state in FIG. 22;

FIG. 24 is a cross-sectional view illustrating a state in which the mirror tilting section 14 is further tilted in the right direction and reaches the neutral position subsequent to the state in FIG. 23 (state in FIG. 5);

FIG. 25 is a cross-sectional view illustrating a state in which the mirror tilting section 14 is tilted to a maximum angle position in a right direction (state in FIG. 7) subsequent to the state in FIG. 24;

DETAILED DESCRIPTION OF THE PREFERRED EMBODIMENT

Figure 1:
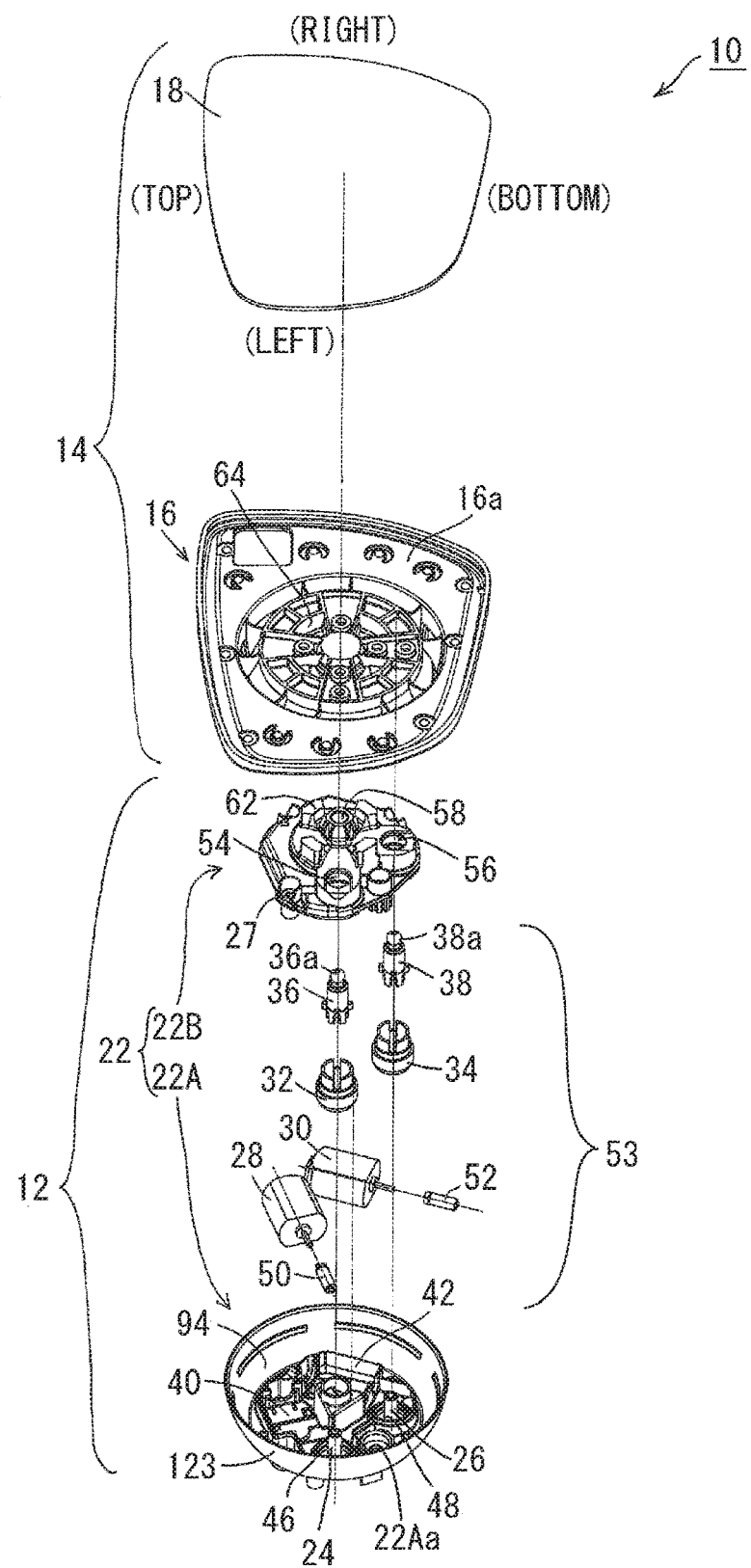
FIG. 1 is an exploded perspective view illustrating an embodiment of a tilting device of a left door mirror for a vehicle, in which a mirror surface angle adjustment mechanism according to this invention is incorporated.

An embodiment of this invention will be described. FIG. 1 is an exploded perspective view of a tilting device 10 of a left-side door mirror for a vehicle to which this invention is applied. This tilting device 10 has a structure based on tilting devices described in Japanese Patent Laid-Open Nos. 2014-159221 and 2014-159222 relating to patent applications filed by the present applicant. The tilting device 10 includes a tilting support section 12 and a mirror tilting section 14. The tilting support section 12 is attached to the inside of an opening of a non-illustrated mirror housing (visor). The mirror tilting section 14 is formed by fitting a mirror 18 (mirror plate) into a recess 16a in a front surface of the mirror holder 16 formed by integral molding using a synthetic resin. The mirror tilting section 14 is joined and supported by a front surface of the tilting support section 12 via pivots to perform mirror surface angle adjustment by means of electromotive driving. The tilting support section 12 includes an actuator housing 22 of a synthetic resin. The actuator housing 22 has a front and rear two-split structure of a housing front 22A disposed on the front side of a vehicle and a housing rear 22B disposed on the rear side of the vehicle. The housing front 22A and the housing rear 22B are fitted together and thereby integrated. The housing front 22A has a bowl-like shape having a round front surface. In the bowl of the housing front 22A, two male thread members 24, 26 are provided in an erected manner at respective positions off a center of the bowl, integrally with the housing front 22A. The male thread member 26 is disposed at a position rotated by 90 degrees from the male thread member 24 relative to the center of the bowl. In respective outer circumferential surfaces of the male thread members 24, 26, respective male threads are formed over an entire length in an axial direction of the male thread members 24, 26.

In the bowl of the housing front 22A, two direct-current motors 28 (for leftward/rightward tilting) and 30 (for upward/downward tilting), and worm wheels 32, 34 (gear member), and the adjustment nuts 36, 38 (nut members) are received. The motors 28, 30 are received and held in respective rectangular recesses 40, 42. The adjustment nuts 36, 38 coaxially and rotatably cover respective free ends (upper ends) of the male thread members 24, 26 and are threadably connected to the respective male threads of the outer circumferential surfaces of the male thread members 24, 26. Consequently, the adjustment nuts 36, 38 rise/fall (advance/withdraw) along the respective male thread members 24, 26 according to directions of rotation of the adjustment nuts 36, 38. In the bowl of the housing front 22A, round recesses 46, 48 are formed coaxially with the respective male thread members 24, 26. Bottoms of the worm wheels 32, 34 are rotatably received and held in the respective recesses 46, 48. Worms 50, 52 are fitted on respective rotary shafts of the motors 28, 30. The worm wheels 32, 34 engage with the respective worms 50, 52 and are driven to rotate by the respective motors 28, 30. The adjustment nuts 36, 38 are coupled to the respective worm wheels 32, 34 so as to be unrotatable relative to the worm wheels 32, 34 (rotatable integrally with the worm wheels 32, 34) and be movable in respective axial directions of the worm wheels 32, 34. Therefore, upon rotation of the motors 28, 30, the adjustment nuts 36, 38 are rotated via the worms 50, 52 and the worm wheels 32, 34. As a result, the adjustment nuts 36, 38 rise/fall (advance/withdraw) along the respective male thread members 24, 26 according to directions of the rotation of the adjustment nuts 36, 38.

The housing rear 22B is put and fitted on the front surface of the housing front 22A. Consequently, a tilting actuator 53 formed of the motors 28, 30, the worms 50, 52, the worm wheels 32, 34 and the adjustment nuts 36, 38 are received in an inner space of the actuator housing 22 formed of the housing front 22A and the housing rear 22B. Here, the worm wheels 32, 34 are each prevented from moving in an axial direction by the housing rear 22B and thereby only allowed to rotate around the axis. Also, convex spheres 36a, 38a at respective front ends of the adjustment nuts 36, 38 protrude outside the actuator housing 22 from respective openings 54, 56 formed at respective positions off a center position of the housing rear 22B.

The mirror tilting section 14 is tiltably held by a front surface of the actuator housing 22. In other words, a pivot convex 58 is formed at a center of the front surface of the housing rear 22B, and a pivot concave 60 (FIG. 10) is formed at a center of a back surface (rear surface) of the mirror holder 16. Spherical-joint coupling of the pivot convex 58 and the pivot concave 60 by means of forcible fitting causes the mirror holder 16 to be held by the housing rear 22B so as to be tiltable rightward/leftward of the vehicle and upward/downward of the vehicle relative to the housing rear 22B. Around the pivot convex 58 in the front surface of the housing rear 22B, four rotation-preventing protrusions 62 are provided in a protruding manner at respective equally-spaced positions (positions equally spaced by 90 degrees) in a circumferential direction of the pivot convex 58. Around the pivot concave 60 of the mirror holder 16, four rotation-preventing holes 64 are provided so as to open at respective equally-spaced positions in a circumferential direction of the pivot concave 60 (positions equally spaced by 90 degrees), corresponding to the rotation-preventing protrusions 62. With the pivot convex 58 and the pivot concave 60 forcibly fitted together, the respective rotation-preventing protrusions 62 are movably inserted into the respective rotation-preventing holes 64 in a depth direction of the rotation-preventing holes 64. Consequently, the mirror tilting section 14 tilts in such a manner that the mirror tilting section 14 is prevented from rotating relative to the tilting support section 12. In the back surface of the mirror holder 16, concave spheres 66, 68 (FIG. 10) are formed at respective positions at which the concave spheres 66, 68 face the respective convex spheres 36a, 38a at the front ends of the adjustment nuts 36, 38. The convex spheres 36a, 38a are fitted in and thereby coupled to the concave spheres 66, 68, respectively, as spherical joints. As a result, an angle in a horizontal direction of the mirror surface is adjusted according to a position to which the adjustment nut 36 has risen/fallen relative to the male thread member 24. Also, an angle in a vertical direction of the mirror surface is adjusted according to a position to which the adjustment nut 38 has risen/fallen relative to the male thread member 26.

The tilting device 10 in FIG. 1 is assembled, for example, as follows. With respect to the tilting support section 12, the motors 28, 30 fitted with the worms 50, 52 are received in the respective recesses 40, 42 of the housing front 22A of the tilting support section 12. The adjustment nuts 36, 38 are screwed onto the respective male thread members 24, 26. The worm wheels 32, 34 are coaxially inserted outside of the adjustment nuts 36, 38, and the lower parts of the worm wheels 32, 34 are rotatably held in the respective recesses 46, 48. At this time, the worm wheels 32, 34 engage with the respective worms 50, 52. The housing rear 22B is put on the housing front 22A, and the housing front 22A and the housing rear 22B are tentatively coupled. This tentative coupling is performed by detachably engaging two claws 70 formed in a protruding manner at a center on the back side of the housing rear 22B with a claw engagement portion 72 formed at a center of the housing front 22A in FIG. 5. Consequently, the tilting support section 12 is assembled as in FIG. 2 (state as viewed from the front) and FIG. 3 (state as viewed from the right side). The engagement of the two claws 70 with the claw engagement portion 72 can be viewed through a hole 58a provided at a center of the pivot convex 58 in FIG. 2. Also, the engagement can be viewed in a recess 73 formed at a center of the housing front 22A in FIG. 4.

Meanwhile, with respect to the mirror tilting section 14, the mirror 18 is fitted and set in the recess 16a in the front surface of the mirror holder 16 in FIG. 1. Consequently, the mirror tilting section 14 is assembled. In general, a butyl rubber double-sided tape is attached to between opposed surfaces of the mirror 18 and the mirror holder 16 to suppress chatter vibration of the mirror surface. However, in this embodiment, a chatter vibration suppression effect is provided by a later-described outer pivot 90, and thus, no butyl rubber double-sided tape is used, reducing the number of components.

After the tilting support section 12 and the mirror tilting section 14 being assembled, respectively, as described above, grease is charged in the pivot concave 60. Also, grease is charged into an entire circumference of a gap 104 (see FIG. 10) between an outer-pivot convex surface-forming annular wall 100 and an outer auxiliary annular wall 102, which will be described later. Next, the tilting support section 12 and the mirror tilting section 14 are positioned in a surface direction and a rotation direction and joined. The positioning in the surface direction is performed by aligning respective center positions of the tilting support section 12 and the mirror tilting section 14 (that is, a tip of the pivot convex 58 is brought into abutment with an entrance of the pivot concave 60 (FIG. 10)). The positioning in the rotation direction is performed by alignment between a position in the rotation direction of an alignment mark 74 formed in an outer circumferential surface of the housing front 22A and a position in the rotation direction of an alignment mark 76 formed in the back surface of the mirror holder 16 in FIG. 4. As a result of the positioning, the pivot convex 58 and the pivot concave 60 face each other, the four rotation-preventing protrusions 62 face the four rotation-preventing holes 64, respectively, and the convex spheres 36a, 38a of the adjustment nuts 36, 38 and the concave spheres 66, 68 of the mirror holder 16 face each other, respectively. In this state, the tilting support section 12 and the mirror tilting section 14 are strongly manually pressed against each other in the respective directions in which the tilting support section 12 and the mirror tilting section 14 face each other. Consequently, the pivot convex 58 and the pivot concave 60 are forcibly fitted together. Also, the convex spheres 36a, 38a of the adjustment nuts 36, 38 are forcibly fitted in the concave spheres 66, 68 of the mirror holder 16, respectively. Also, the four rotation-preventing protrusions 62 are inserted into the four rotation-preventing holes 64, respectively. Consequently, the tilting support section 12 and the mirror tilting section 14 are joined to each other without screw fastening. Consequently, the tilting device 10 is assembled in the state in FIGS. 4 and 5 (diagrams of the cross-section along arrow A-A in FIG. 4, the cross-section being rotated by 180 degrees).

The tilting device 10 assembled as described above will be described with reference to FIG. 5. An inner pivot 88 and an outer pivot 90, which are concentric to each other and have different diameters, are formed between the tilting support section 12 and the mirror tilting section 14. The inner pivot 88 is formed by the pivot convex 58 and the pivot concave 60 being forcibly fitted together. The outer pivot 90 is assembled by the forcible fitting in the inner pivot 88. The outer pivot 90 has a structure in which an outer-pivot convex surface 92 formed at the mirror holder 16 and an outer-pivot concave surface 94 formed at the housing front 22A of the tilting support section 12 are slidably fitted together. Each of the outer-pivot convex surface 92 and the outer-pivot concave surface 94 is a spherical surface. Each of pivot centers O of the inner pivot 88 and the outer pivot 90 is located in a center position of the sphere of the pivot convex 58. The convex sphere 36a of the adjustment nut 36 is fitted in the rightward/leftward-tilting concave sphere 66, whereby the concave sphere 66 and the convex sphere 36a are coupled as a spherical joint. Although not illustrated in FIG. 5, likewise, the convex sphere 38a of the adjustment nut 38 is fitted in the upward/downward-tilting concave sphere 68 (FIG. 10), whereby the concave sphere 68 and the convex sphere 38a are coupled as a spherical joint.

Figure 5:
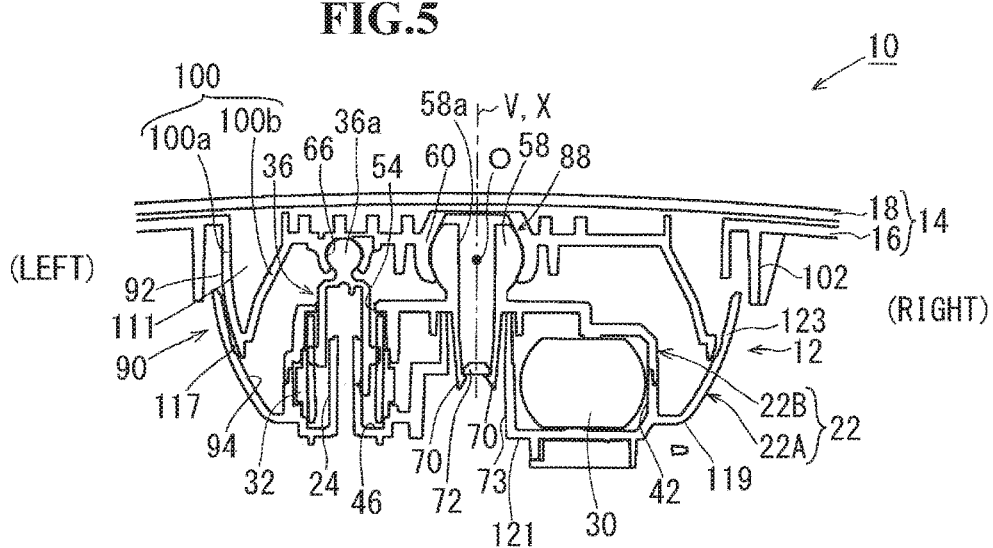
FIG. 5 is a diagram of a cross-section of the tilting device in FIG. 4 taken along arrow A-A, the cross-section being rotated by 180 degrees, where a mirror surface angle is in a neutral position.
Figure 6:
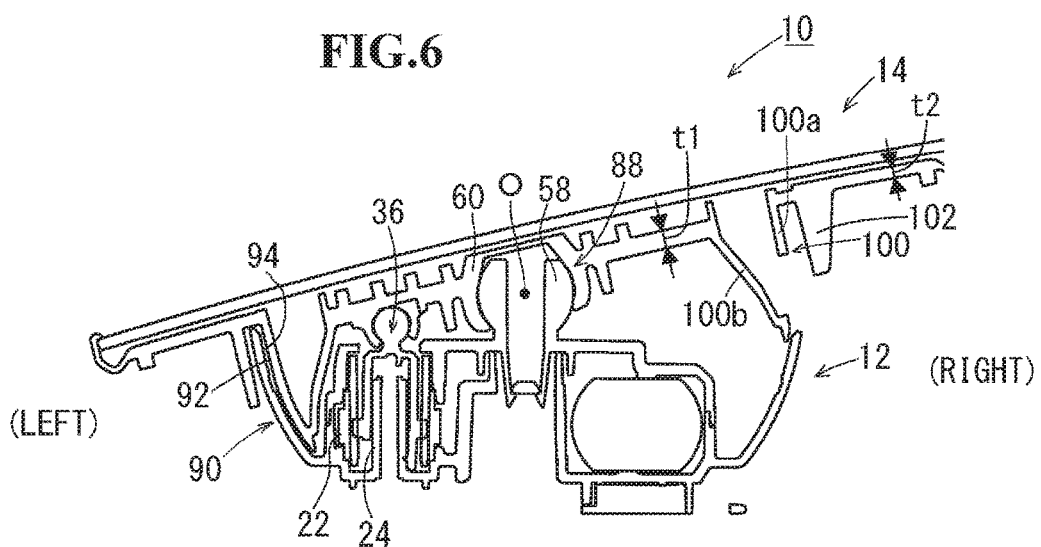
FIG. 6 is a diagram illustrating the cross-section in the same position as that of FIG. 5 where the mirror surface angle is at a maximum angle position in a left direction.
Figure 7:
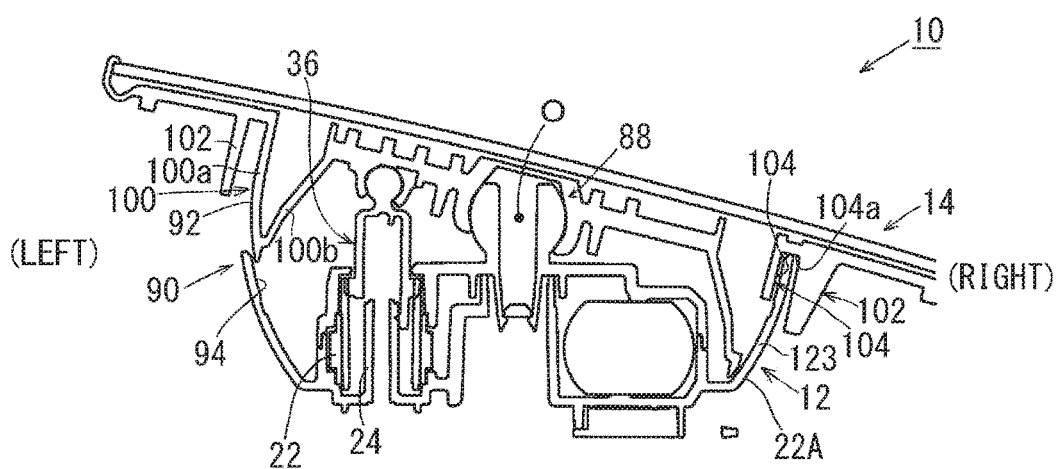
FIG. 7 is a diagram illustrating the cross-section in the same position as that of FIG. 5, where the mirror surface angle is in a maximum angle position in a right direction.

FIG. 5 illustrates a state in which a mirror surface angle is in a neutral position. The neutral state refers to a state in which a tangent plane of the mirror 18 at a position at which a center axis V of the pivot convex 58 intersects with the mirror 18 is perpendicular to the center axis V. Upon the rightward/leftward-tilting motor 28 (FIG. 1) being driven to rotate the worm 50 (FIG. 1) from this state, the worm wheel 32, which forms a worm gear jointly with the worm 50, rotates. The worm wheel 32 is held between the housing front 22A and the housing rear 22B and thus is prevented from moving axially. Upon rotation of the worm wheel 32, the adjustment nut 36 rises/falls the male thread member 24 while the adjustment nut 36 rotates following the rotation. Consequently, the mirror tilting section 14 is tilted with the pivot center O as a center, whereby mirror surface angle adjustment in the horizontal direction is performed. FIG. 6 illustrates a state in which the mirror tilting section 14 is tilted to a maximum angle position in a left direction. Also, FIG. 7 illustrates a state in which the mirror tilting section 14 is tilted to a maximum angle position in a right direction. Mirror surface angle adjustment in the vertical direction is performed likewise. In other words, with reference to FIG. 1, upon the upward/downward-tilting motor 30 being driven to rotate the worm 52, the worm wheel 34, which forms a worm gear jointly with the worm 52, rotates. As with the worm wheel 32, the worm wheel 34 is prevented from moving axially. Upon rotation of the worm wheel 34, the adjustment nut 38 rises/falls the male thread member 24 while the adjustment nut 38 rotates following the rotation. Consequently, the mirror tilting section 14 is tilted with the pivot center O as a center, whereby mirror surface angle adjustment in the vertical direction is performed.

Figure 2:
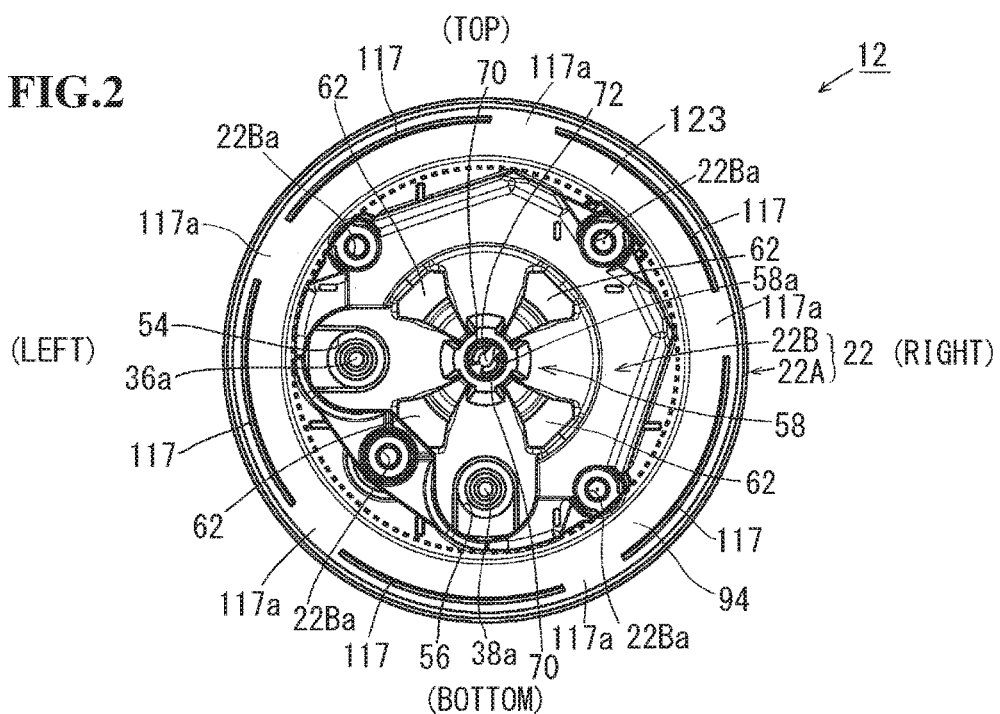
FIG. 2 is a front view illustrating an assembled state of the tilting support section 12 in FIG. 1.
Figure 3:
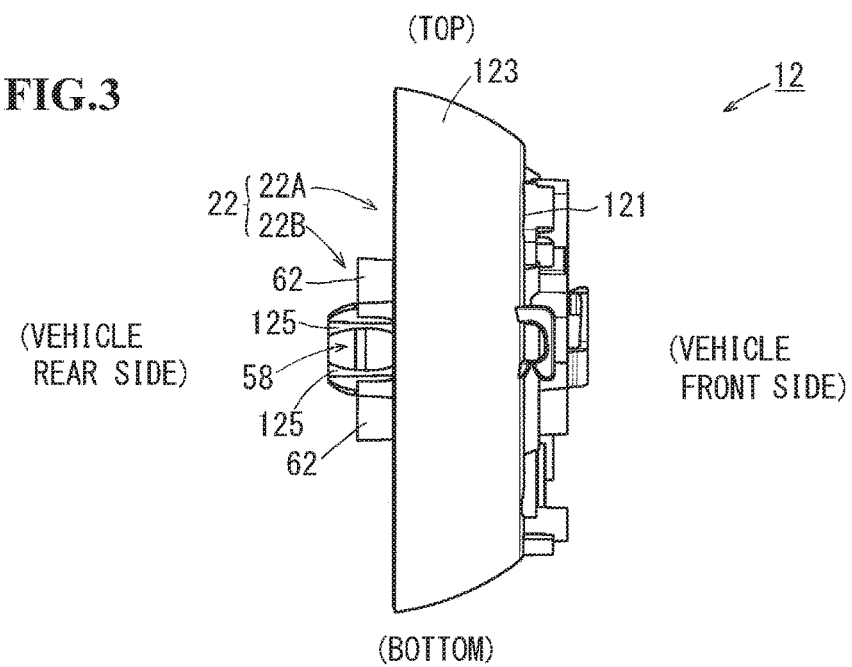
FIG. 3 is a right side view of the tilting support section 12 in FIG. 2.
Figure 4:
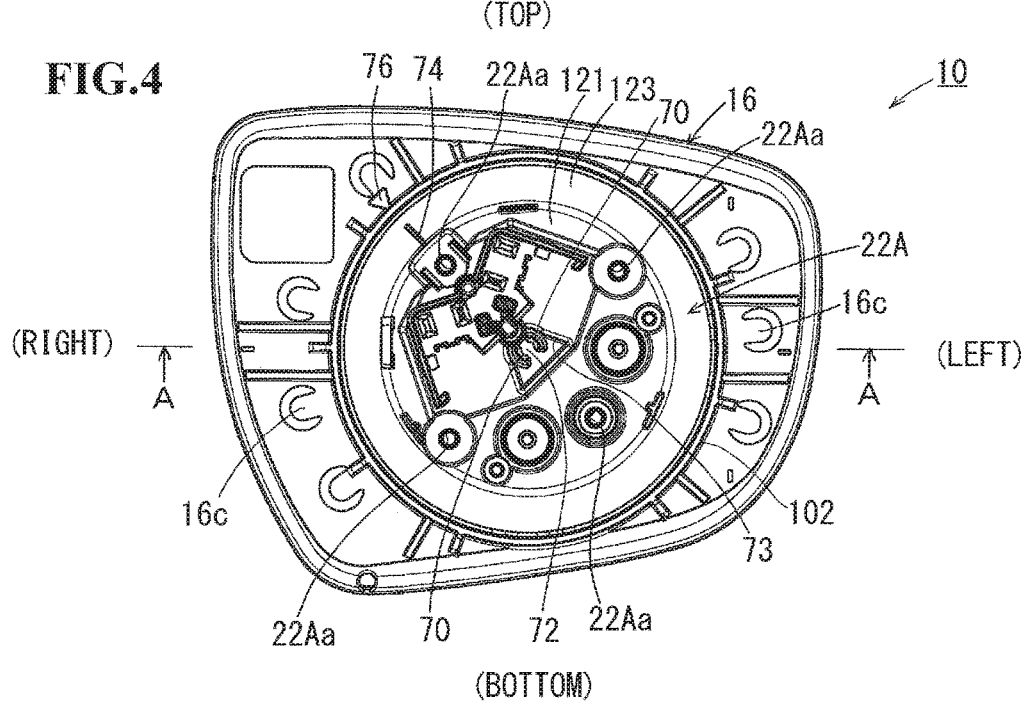
FIG. 4 is a back view illustrating an assembled state of the tilting device 10 in FIG. 1.
Figure 8:
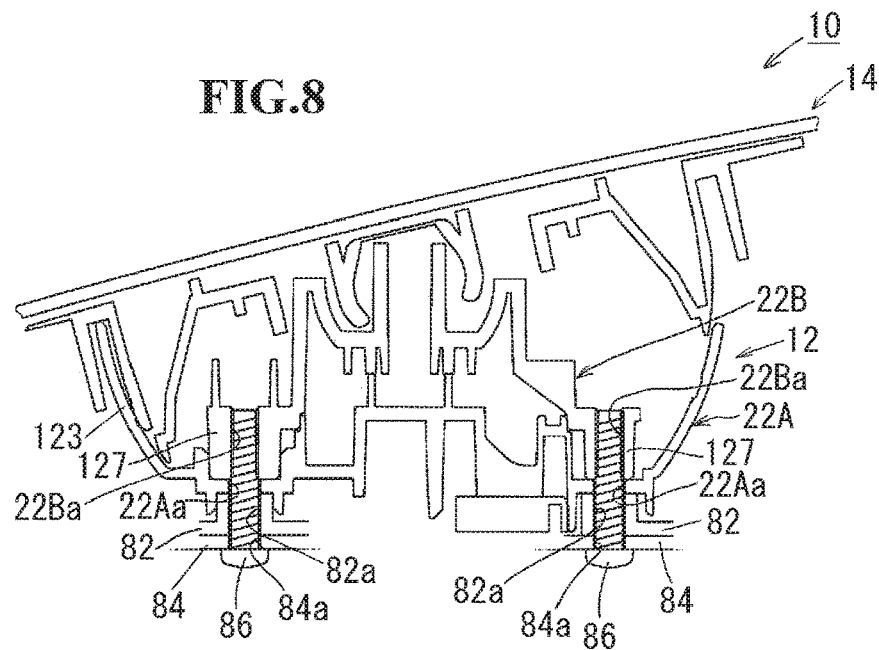
FIG. 8 is a cross-sectional view illustrating the tilting device in the assembled state in FIG. 4 attached to a mirror housing 82 (visor)

Attachment of the assembled tilting device 10 to a mirror housing (visor) is performed, for example, as follows. As illustrated in FIG. 8, the tilting device 10 is positioned at a predetermined attachment position inside an opening of a mirror housing 82. A support 84 (reinforcement resin component) is brought into abutment with a back surface of the mirror housing 82, and four screws 86 are firmly screwed into respective screw holes 22Ba of the housing rear 22B through respective series of screw through-holes 84a, 82a, 22Aa of the support 84, the mirror housing 82 and the housing front 22A. Positions of the four screw through-holes 22Aa of the housing front 22A are indicated in FIG. 4. Also, positions of the screw holes 22Ba of the four housing rear 22B are indicated in FIG. 2. Consequently, the housing front 22A and the housing rear 22B are fully fastened to each other, and the tilting device 10 is attached and fixed to the mirror housing 82. After the attachment, a non-illustrated housing cover (in the case of two piece-type mirror housing) is fitted on the back surface of the mirror housing 82, whereby heads of the screws 86 are hidden from the outside.

Figure 9:
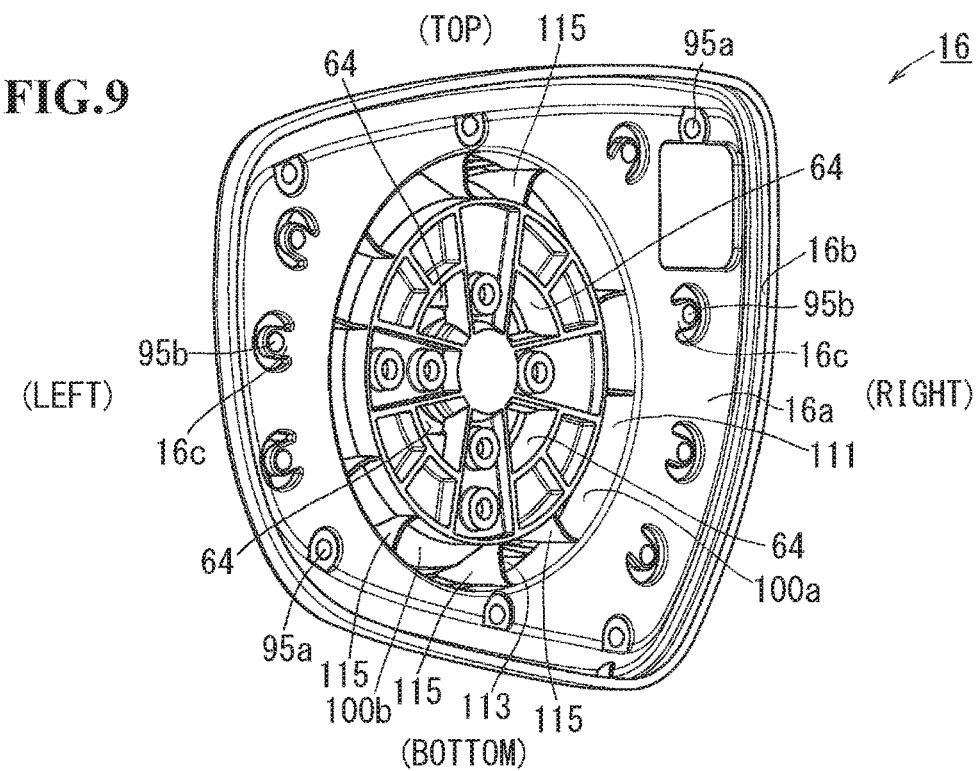
FIG. 9 is a front-side perspective view illustrating the mirror holder 16 in FIG. 1 alone.
Figure 10:
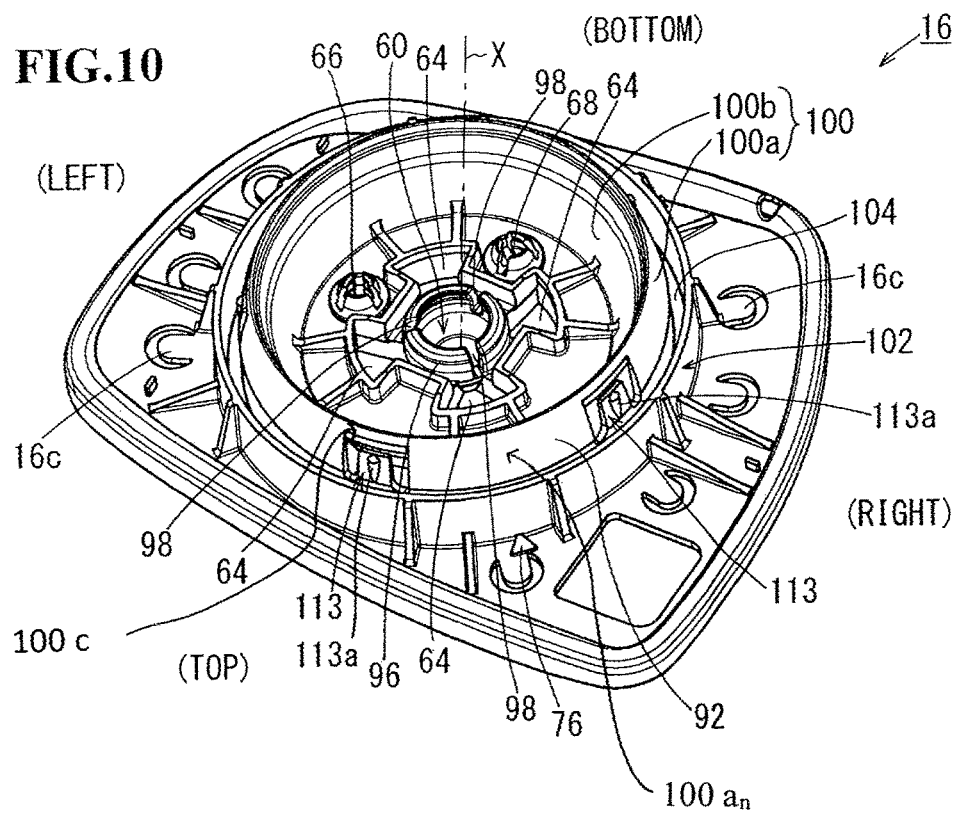
FIG. 10 is a back-side perspective view of the mirror holder in FIG. 9.
Figure 11:
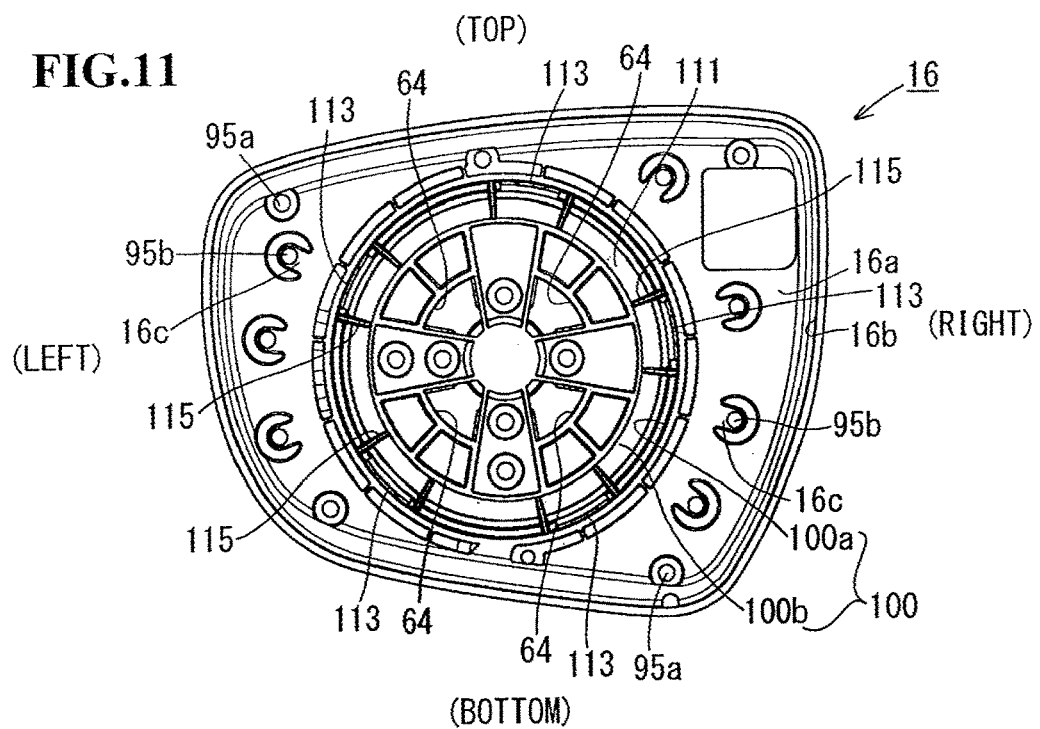
FIG. 11 is a front view of the mirror holder in FIG. 9.
Figure 12:
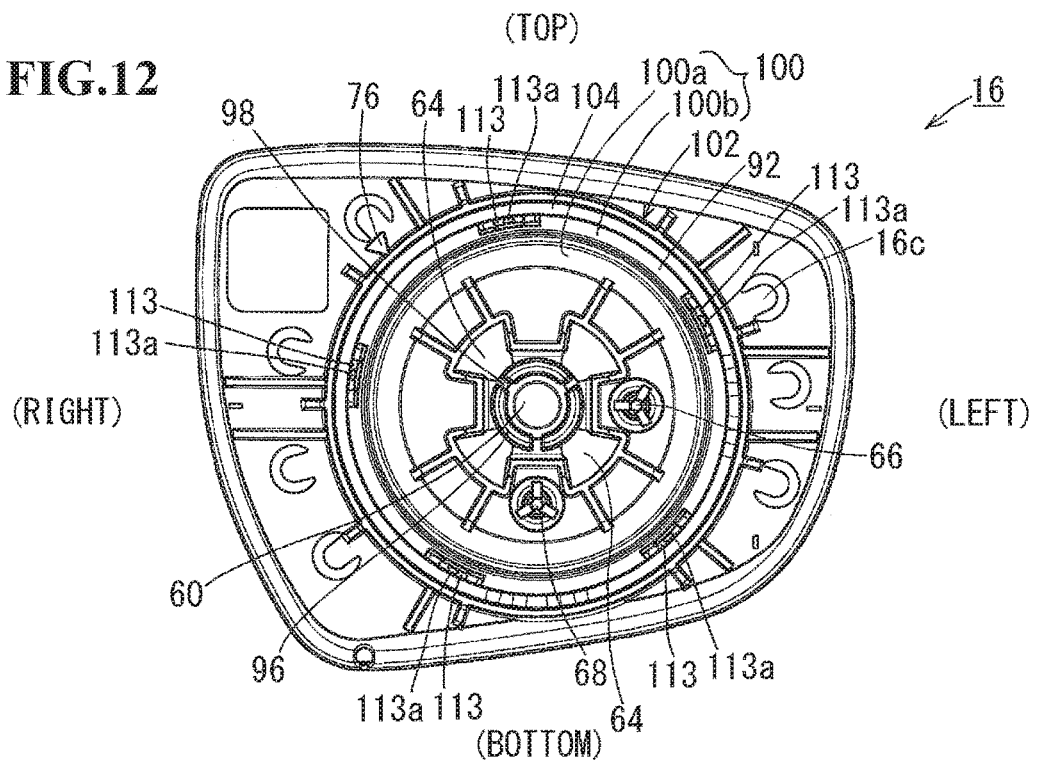
FIG. 12 is a back view of the mirror holder in FIG. 9.
Figure 13:
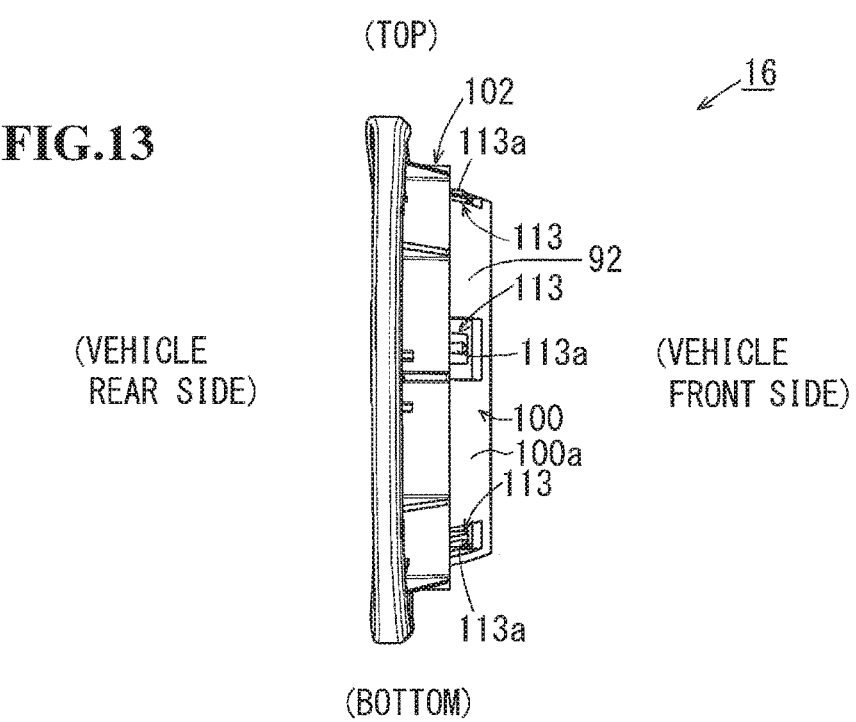
FIG. 13 is a right side view of the mirror holder in FIG. 9.

Here, a detailed configuration of the mirror holder 16 will be described. FIGS. 9 to 13 illustrate the mirror holder 16 alone. FIG. 9 is a perspective view of the front side (side on which the mirror 18 is fitted), FIG. 10 is a perspective view of the back side, FIG. 11 is a front view, FIG. 12 is a back view, and FIG. 13 is a right side view. The mirror holder 16 is formed as an integrally-molded product of a synthetic resin such as polypropylene (PP). In the front surface (FIG. 9) of the mirror holder 16, the recess 16a that allows the mirror 18 to be fitted therein is formed. Upon the mirror 18 being fitted in the recess 16a, an entire circumference of an outer circumferential edge of the mirror 18 is locked by a fold rim 16b of a circumferential edge of the recess 16a, and pressing protrusions 95a, 95b formed in respective areas of an outer circumference of the front surface of the mirror holder 16 press and abuts on a back surface of the mirror 18. Consequently, the mirror 18 is stably held in the mirror holder 16. Each of the pressing protrusions 95a is a protrusion provided directly at the front surface of the mirror holder 16 in a protruding manner. Also, each of the pressing protrusions 95b is a protrusion formed on an elastic piece 16c formed in a cantilever-supported manner by cutting a surface of the mirror holder 16. At the center of the back surface (FIG. 10) of the mirror holder 16, a pivot concave annular wall 96 forming the pivot concave 60 of the inner pivot 88 is formed in a protruding manner. Three slits 98 are formed at respective positions equally spaced (equally spaced by 120 degrees) in a circumferential direction of the pivot concave annular wall 96, whereby the pivot concave annular wall 96 are divided in three in the circumferential direction. The slits 98 make elastic deformation of the pivot concave annular wall 96 easy. Therefore, in the state where the pivot convex 58 forcibly fitted in the pivot concave 60, the pivot convex 58 can be held in the pivot concave 60 with less backlash. In addition, the number of divisions is three, ensuring centering of the pivot. In the forcibly fitted state, the pivot concave annular wall 96 catches (grabs) the pivot convex 58 by means of an elastic force thereof, providing a predetermined pressing force to the pivot convex 58. Also, since the pivot concave annular wall 96 easily elastically deforms, the support of the mirror tilting section 14 by the outer pivot 90 is uniformized in a circumferential direction of the outer pivot 90. In other words, if the support of the mirror tilting section 14 by the outer pivot 90 is biased in the circumferential direction of the outer pivot 90, a pressing force generated by the bias acts on the pivot concave annular wall 96, which causes elastic deformation of the pivot concave annular wall 96. As a result, the bias is corrected, and the support of the mirror tilting section 14 by the outer pivot 90 is uniformized in the circumferential direction of the outer pivot 90, providing a chatter vibration suppression effect. The four rotation-preventing holes 64 are formed just on the outer circumferential side of the pivot concave annular wall 96. At the back surface of the mirror holder 16, the outer-pivot convex surface-forming annular wall 100 forming the outer pivot 90 is formed continuously around an entire circumference of 360 degrees in a protruding manner on the outer circumferential side of the pivot concave annular wall 96. Furthermore, the outer auxiliary annular wall 102 is formed continuously around an entire circumference of 360 degrees in a protruding manner on the outer circumferential side of the outer-pivot convex surface-forming annular wall 100. The pivot concave annular wall 96, the outer-pivot convex surface-forming annular wall 100 and the outer auxiliary annular wall 102 are disposed concentrically to one another. A gap 104 is formed continuously around an entire circumference of 360 degrees between the outer-pivot convex surface-forming annular wall 100 and the outer auxiliary annular wall 102. An outer-pivot concave surface-forming annular wall 123 (FIG. 1) of the housing front 22A is received in the gap 104 in such a manner that the outer-pivot concave surface-forming annular wall 123 can move into/out from the gap 104 according to tilting of the mirror tilting section 14, and thus, the outer-pivot concave surface-forming annular wall 123 moves (swings) in the gap 104. In an area, between the pivot concave annular wall 96 and the outer-pivot convex surface-forming annular wall 100, of the back surface of the mirror holder 16, the concave spheres 66, 68 that allow the convex spheres 36a, 38a of the adjustment nuts 36, 38 to be forcibly fitted therein are disposed. For the forcible fitting, a slit is formed at each of three positions in a circumferential direction of each of the concave spheres 66, 68. As clearly indicated in FIG. 6 for example, a general plate thickness t1 (for example, 3 mm) of the area, between the pivot concave annular wall 96 and the outer-pivot convex surface-forming annular wall 100, of the plate of the mirror holder 16 is set to be larger than a general plate thickness t2 (for example, 2 mm) of an area on the outer circumferential side of the outer-pivot convex surface-forming annular wall 100. Consequently, a stiffness of an area of the mirror holder 16, the area being coupled to the tilting support section 12, is enhanced, enabling provision of a mirror surface vibration suppression effect. Also, a stiffness of the area on the outer circumferential side of the mirror holder 16 is decreased, enabling the mirror 18 to be easily fitted into the mirror holder 16.

In FIG. 10, the outer-pivot convex surface-forming annular wall 100 includes an annular wall body 100 a forming the outer-pivot convex surface 92, and an inner auxiliary annular wall 100 b disposed on the inner circumferential side of the annular wall body 100 a. A top of the annular wall body 100 a and a top of the inner auxiliary annular wall 100 b are coupled in an entire circumference of 360 degrees. As viewed from the front side (FIG. 9) of the mirror holder 16, the annular wall body 100 a and the inner auxiliary annular wall 100 b are disposed concentrically to each other across a space 111 (opening) having a predetermined width in a radial direction around the entire circumference of 360 degrees. In this way, the outer-pivot convex surface-forming annular wall 100 has a dual structure formed of the annular wall body 100 a and the inner auxiliary annular wall 100 b. Consequently, a stiffness of the outer-pivot convex surface-forming annular wall 100 is enhanced. Further, a continuous annular rim 100 c of the annular wall 100, provided proximate free ends of the plurality of elastic pieces 113, delimits the plurality of openings. Additionally, the annular wall 100 includes circumferentially extending arcuate wall surfaces 100 $a_n$, wherein each of the circumferentially extending arcuate wall surfaces 100 $a_n$ extends circumferentially between adjacent ones of the plurality of openings. Further, the continuous annular rim 100 c is formed integral with the circumferentially extending arcuate wall surfaces 100 $a_n$.

As illustrated in, e.g., FIGS. 10 and 12, in the annular wall body 100a, five elastic pieces 113 are formed at respective equally-spaced positions (positions equally spaced by 72 degrees) in the circumferential direction of the spaced annular wall body 100a. Each elastic piece 113 is formed by cutting the annular wall body 100a, and is supported in a cantilevered manner on the annular wall body 100a. A protrusion 113a is formed at a center of an outward-directed surface of each elastic piece 113. A top of the protrusion 113a of each elastic piece 113 slidably and elastically abuts on the outer-pivot concave surface 94 (e.g., FIGS. 1 and 5) formed at the tilting support section 12. Consequently, the mirror tilting section 14 is not only supported by the tilting support section 12 via the inner pivot 88 but also is elastically supported by the tilting support section 12 via the outer pivot 90, enabling suppression of mirror surface vibration caused by, e.g., a wind generated by movement of the vehicle or vibration of the vehicle. At this time, the elastic pieces 113 abut on the outer-pivot concave surface 94 by means of point contact via the protrusions 113a, enabling reduction in slide resistance between the elastic pieces 113 and the outer-pivot concave surface 94 and in addition, enabling making the slide resistance constant by absorption of piece-to-piece variations (molding errors). Also, since the five elastic pieces 113 are disposed at the respective equally-spaced positions (positions equally-spaced by 72 degrees) in the circumferential direction of the outer-pivot convex surface-forming annular wall 100, even if a support failure occurs in one of the elastic pieces 113, the mirror tilting section 14 can be supported on a half or more of the outer-pivot concave surface 94 via the remaining four elastic pieces 113. Therefore, an extreme decrease in performance of the support of the mirror tilting section 14 by the outer pivot 90 is prevented. Here, as a result of the elastic pieces 113 being formed by cutting the annular wall body 100a, the annular wall body 100a includes holes. However, since the inner auxiliary annular wall 100b with no holes is disposed on the inner circumferential side of the annular wall body 100a, which suppresses entry of, e.g., foreign substances and/or water into space on the inner circumferential side relative to the outer pivot 90.

As illustrated in FIG. 9, in the space 111, between the annular wall body 100a and the inner auxiliary annular wall 100b, of the outer-pivot convex surface-forming annular wall 100, a plurality of ribs 115 joining the annular wall body 100a and the inner auxiliary annular wall 100b are disposed at appropriate intervals. The stiffness of the outer-pivot convex surface-forming annular wall 100 is further enhanced by the ribs 115. In particular, the ribs 115 are disposed at respective positions on the right and left sides (in the circumferential direction) of the respective elastic pieces 113 in the annular wall body 100a, the positions being close to the respective elastic pieces 113, and thus, decrease in stiffness of the annular wall body 100a resulting from the elastic pieces 113 being formed by cutting the annular wall body 100a can be compensated for by the ribs 115.

Figure 14:
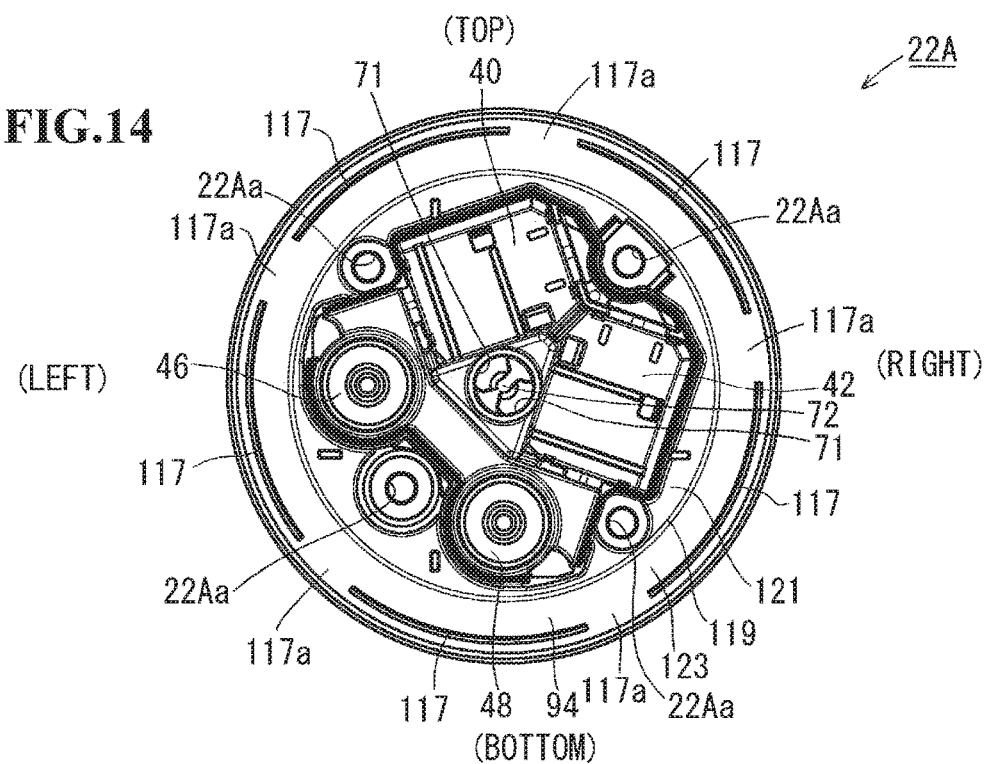
FIG. 14 is a front view of the housing front 22A in FIG. 1 alone.
Figure 15:
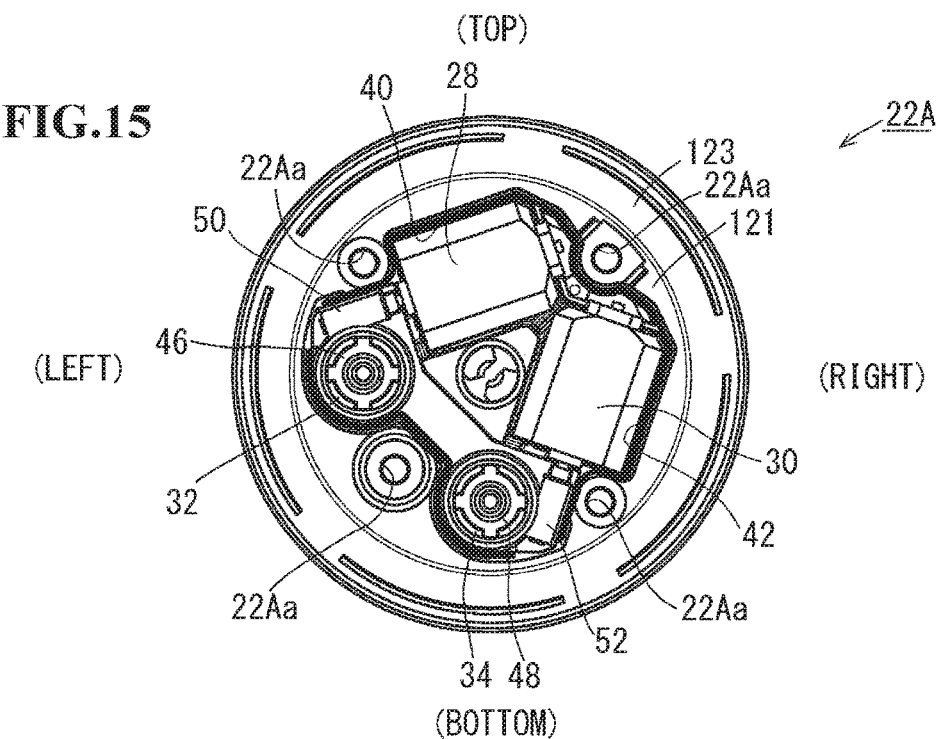
FIG. 15 is a front view of worm-equipped motors and worm wheels disposed in the housing front in FIG. 14.

Next, a detailed configuration of the housing front 22A will be described. FIG. 14 is a front view of the housing front 22A alone. The housing front 22A is an integrally-molded product of a synthetic resin such as ABS resin and is formed in a bowl-like shape as mentioned above. The housing front 22A includes a flat portion 121 on the inner circumferential side and a curved outer-pivot concave surface-forming annular wall 123 on the outer circumferential side, which are separated from each other in a radial direction with a predetermined radial position 119 as a boundary. In the flat portion 121, as described above, e.g., the rectangular recesses 40, 42 that receive and hold the motors 28, 30, the round recesses 46, 48 that rotatably receive and hold the lower parts of the worm wheels 32, 34, the four screw through-holes 22Aa and the claw engagement portion 72 are formed. The two claws 70 (e.g., FIGS. 2, 4, 5 and 17) of the housing rear 22B engage with the claw engagement portion 72. The engagement causes the housing front 22A and the housing rear 22B to be tentatively coupled. The two claws 70, 70 of the housing rear 22B enter holes 71, 71 on the opposite, right and left, sides of the claw engagement portion 72 and detachably engage with right/left parts of the claw engagement portion 72, respectively. An inner circumferential surface of the outer-pivot concave surface-forming annular wall 123 is a spherical surface, and the inner circumferential surface forms the outer-pivot concave surface 94. At a position partway in a radial direction of the outer-pivot concave surface 94, a circumferentially-extending groove 117 is formed. This groove 117 forms a grease reservoir of the outer pivot 90. The grease reservoir 117 discontinues at five circumferentially equally-spaced parts 117a (equally spaced by 72 degrees). These ungrooved parts 117a are parts that allow the protrusions 113a of the respective elastic pieces 113 (e.g., FIGS. 10 and 3) to slide thereon. In order not to hinder the sliding, the groove 117 is eliminated in the ungrooved parts 117a. FIG. 15 illustrates a state in which the motors 28, 30 are received and held in the recesses 40, 42 and the worm wheels 32, 34 are received in the recesses 46, 48. The worms 50, 52 fitted on the rotary shafts of the motors 28, 30 engage with the worm wheels 32, 34, respectively.

Figure 16:
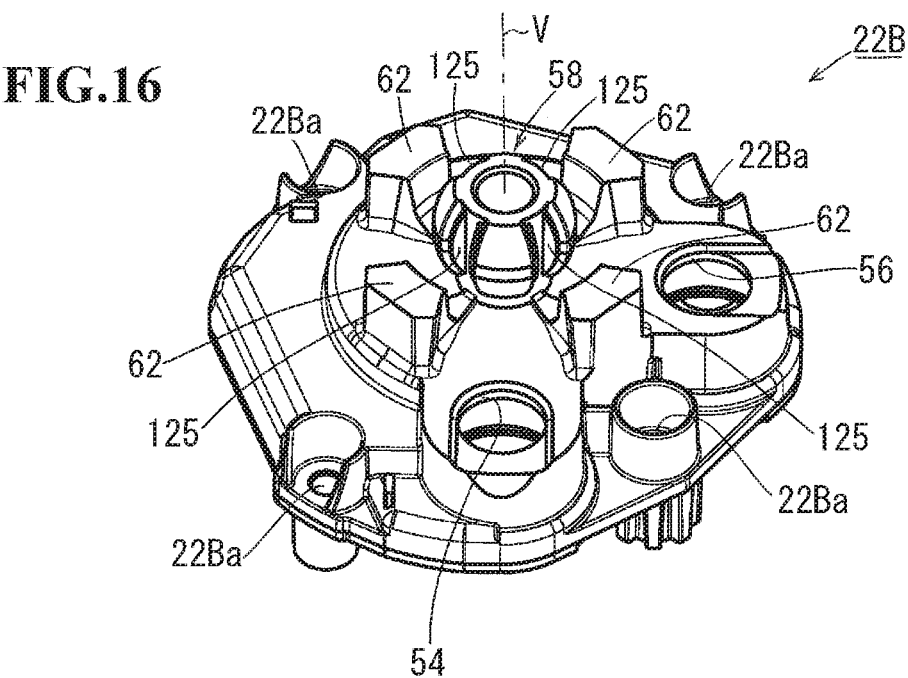
FIG. 16 is a perspective view of the housing rear 22B in FIG. 1 alone as viewed from the front side.
Figure 17:
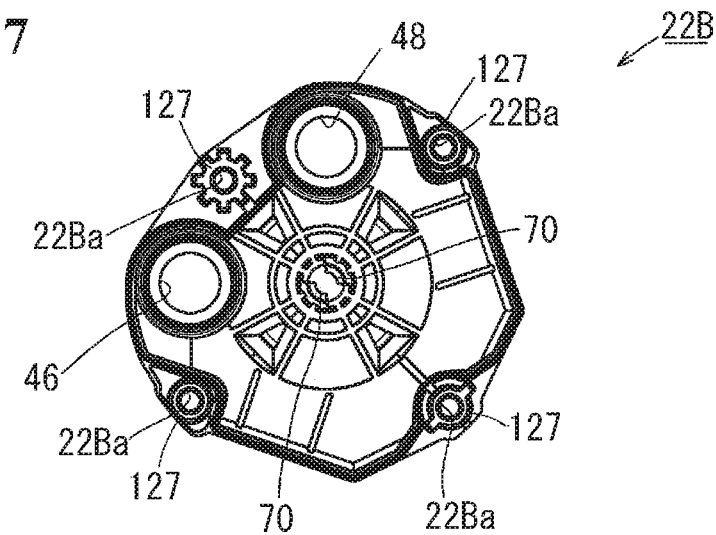
FIG. 17 is a back view of the housing rear in FIG. 16.

Next, a detailed configuration of the housing rear 22B will be described. FIG. 16 is a perspective view of the housing rear 22B alone as viewed from the front side, and FIG. 17 is a back view of the housing rear 22B. As with the housing front 22A, the housing rear 22B is formed as an integrally-molded product of a synthetic resin such as ABS resin. In FIG. 16, the pivot convex 58 is formed in a protruding manner at the center of the front surface of the housing rear 22B. Four grooves 125 extending in a direction of the center axis V of the pivot convex 58 are formed at respective positions equally-spaced in the circumferential direction (positions equally-spaced by 90 degrees) in an outer circumferential surface of the pivot convex 58. The four rotation-preventing protrusions 62 are formed in a protruding manner at the respective positions surrounding the pivot convex 58 in the front surface of the housing rear 22B. Furthermore, in the housing rear 22B, e.g., the openings 54, 56 and the screw holes 22Ba are formed. The adjustment nuts 36, 38 move into/out from the respective openings 54, 56. The four screws 86 (FIG. 8) are screwed into the respective screw holes 22Ba. The four screws 86 fasten the housing front 22A and the housing rear 22B to each other and attach and fix the tilting device 10 to the mirror housing 82. In FIG. 17, the aforementioned two claws 70 are provided in a protruding manner at the center of the back surface of the housing rear 22B. Four bosses 127 are provided in a protruding manner at an outer circumference of the back surface of the housing rear 22B. In these bosses 127, the aforementioned screw holes 22Ba are provided along respective center axes thereof. Upon the housing rear 22B being put on the housing front 22A and then being depressed, the two claws 70 engage with the claw engagement portion 72 (e.g., FIGS. 2, 4, 5 and 14) of the housing front 22A. Consequently, the housing front 22A and the housing rear 22B are fitted together and tentatively coupled to each other. Consequently, the tilting actuator 53 (FIG. 1) disposed on the flat portion 121 (FIG. 15) of the housing front 22A is received in the inner space of the actuator housing 22 formed of the housing front 22A and the housing rear 22B. At this time, only the convex spheres 36a, 38a of the adjustment nuts 36, 38 protrude from the respective openings 54, 56 of the housing rear 22B. Also, the four screw through-holes 22Aa of the housing front 22A and the four screw holes 22Ba of the housing rear 22B communicate with each other, respectively.

Figure 18:
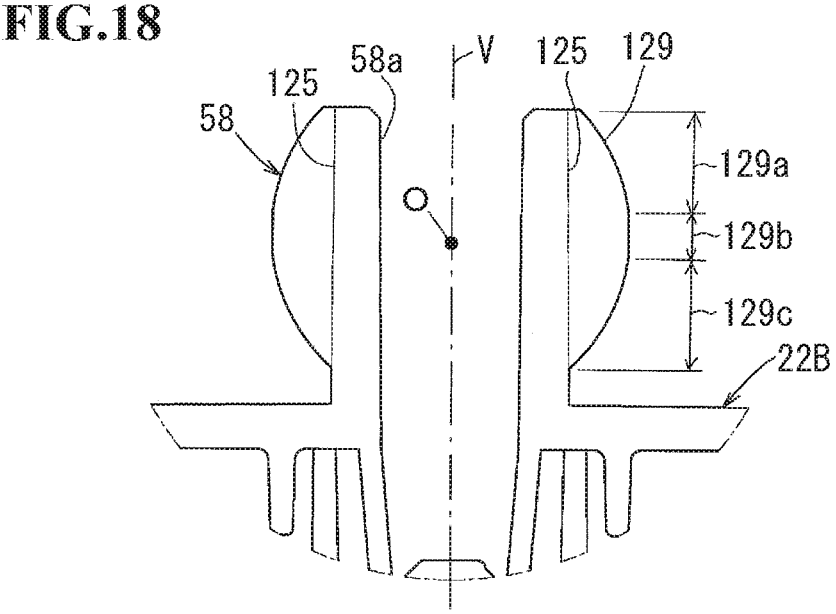
FIG. 18 is a cross-sectional view of the pivot convex 58 in FIG. 16 cut along a plane extending through a center axis V of the pivot convex 58.
Figure 19:
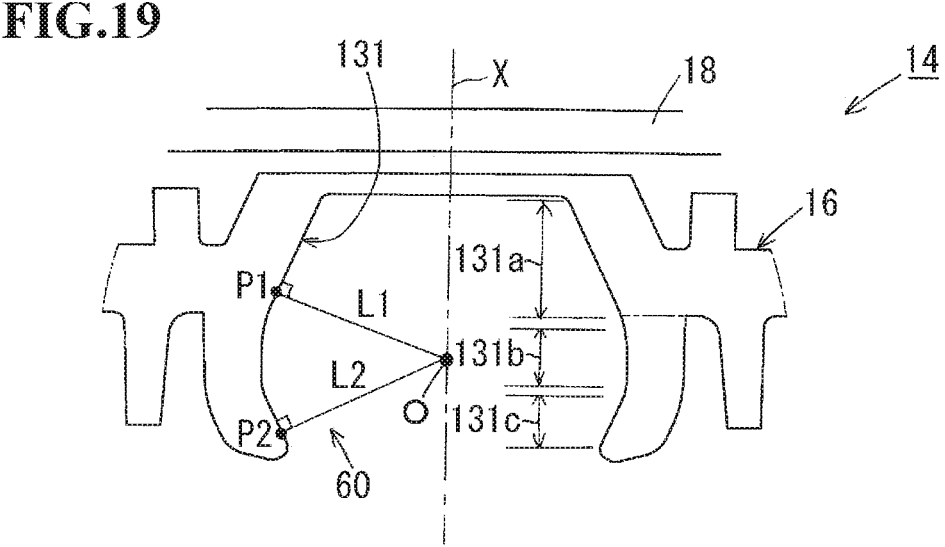
FIG. 19 is a cross-sectional view of the pivot concave 60 in FIG. 10 cut along a plane extending through a center axis X of the pivot concave 60.

Surface shapes of the pivot convex 58 and the pivot concave 60 of the inner pivot 88 will be described. FIG. 18 illustrates a convex surface shape of the pivot convex 58. Alternate long and short dash line V indicates the center axis of the pivot convex 58. An upper area 129a and a lower area 129c of the outer circumferential surface (convex surface 129) of the pivot convex 58 are formed of respective spherical surfaces having a same radius with the pivot center O as a center. An intermediate area 129b of the outer circumferential surface (convex surface 129) of the pivot convex 58 between the upper area 129a and the lower area 129c is formed of a cylindrical surface with a center axis X as a center axis. FIG. 19 illustrates a concave surface shape of the pivot concave 60 (shape when the pivot convex 58 is fitted in the pivot concave 60). Alternate long and short dash line X indicates a center axis of the pivot concave 60. An upper area 131a of an inner circumferential surface (concave surface 131) of the pivot concave 60 is formed of a conical surface of a partial area along the center axis X of a cone having an apex on the upper side. Also, a lower area 131c of the inner circumferential surface (concave surface 131) of the pivot concave 60 is formed of a conical surface of a partial area along the center axis X of a cone having an apex on the lower side. An apex angle of the cone in the upper area 131a and an apex angle of the cone in the lower area 131c are equal to each other. Cone axes of the conical surfaces of the upper area 131a and the lower area 131c coincide to the center axis X. A length of the lower area 131c in a direction along the center axis X is shorter than a length of the upper area 131a in the same direction. The intermediate area 131b of the inner circumferential surface (concave surface 131) of the pivot concave 60 between the upper area 131a and the lower area 131c is formed of a cylindrical surface with the center axis X as a center axis. Respective boundary parts among the upper area 131a, the intermediate area 131b and the lower area 131c are connected by smooth curves. The apex angles of the cone in the upper area 131a and the lower area 131c are set so as to satisfy the following conditions. In other words, line L1 connecting the upper area 131a and the pivot center O is perpendicular to a surface of the upper area 131a at a partway position P1 in the axis X direction in the upper area 131a. Also, line L2 connecting the lower area 131c and the pivot center O is perpendicular to a surface of the lower area 131c at a partway position P2 in the axis X direction in the lower area 131c.

Figure 20:
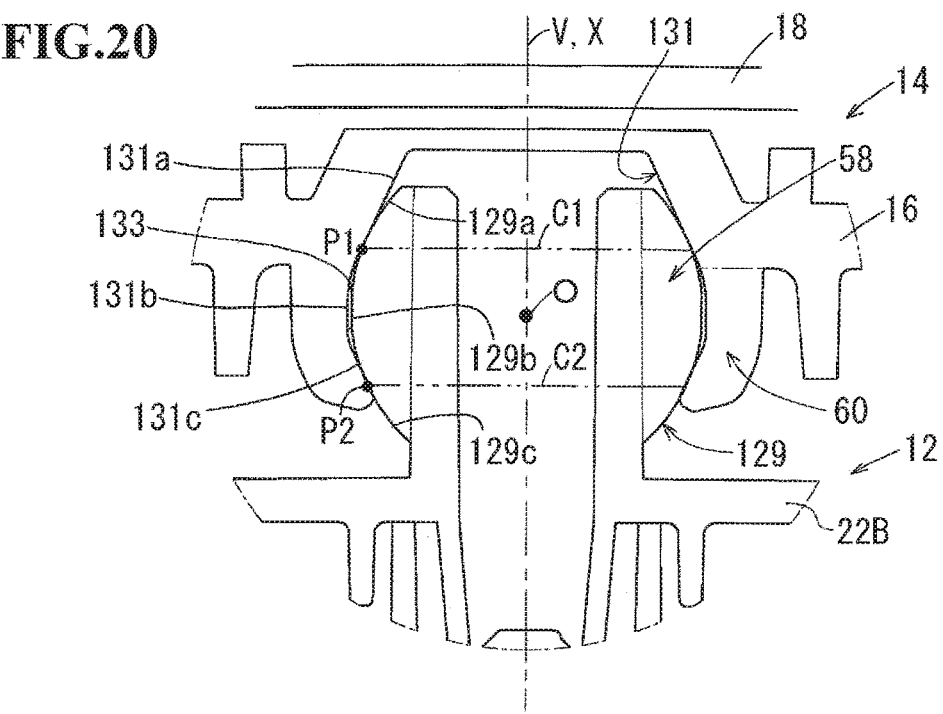
FIG. 20 is a diagram illustrating the pivot convex in FIG. 18 and the pivot concave in FIG. 19 forcibly fitted together, and is a cross-sectional view at the position that is the same as that of FIGS. 18 and 19 where a mirror tilting section is in a neutral position.
Figure 21:
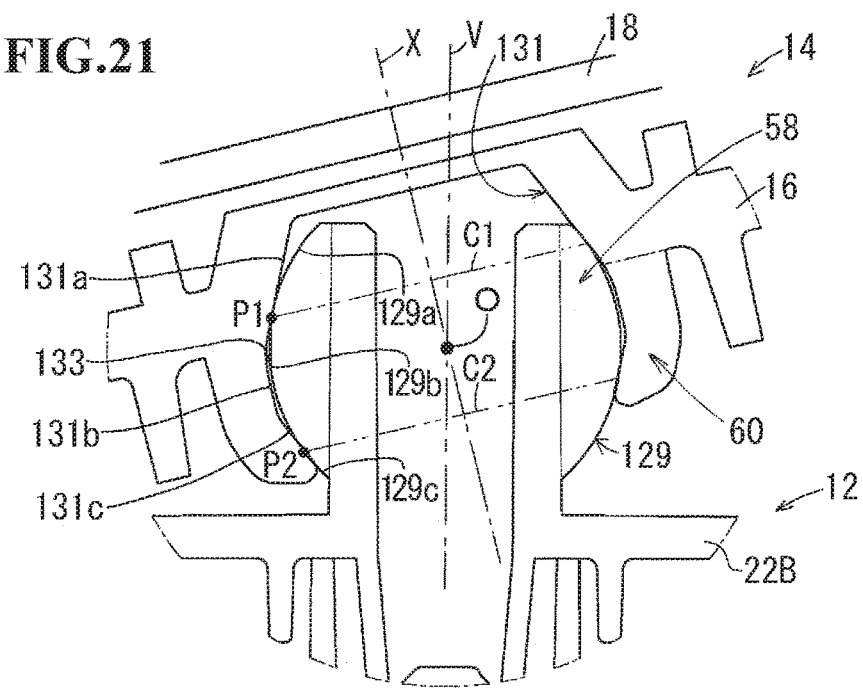
FIG. 21 is a diagram of the forcible fitting part in FIG. 20 where the mirror tilting section 14 is tilted in the left direction from the state in FIG. 20, and is a cross-sectional view at a position that is the same as that of FIG. 20.

FIG. 20 illustrates a state in which the pivot convex 58 and the pivot concave 60 of the inner pivot 88 are forcibly fitted together. The mirror tilting section 14 is in the neutral position as indicated in FIG. 5. In this case, the respective spherical surfaces of the upper area 129a and the lower area 129c of the pivot convex 58 are inscribed in (internally contact with) the respective conical surfaces of the upper area 131a and the lower area 131c of the pivot concave 60. In other words, the convex surface 129 of the pivot convex 58 is in abutment with the concave surface 131 of the pivot concave 60 only via respective entire circumferences of circumferential positions C1, C2 at the positions P1, P2. FIG. 21 illustrates a state when the mirror tilting section 14 is tilted leftward from the state in FIG. 20. In this case, also, the convex surface 129 of the pivot convex 58 is in abutment with the concave surface 131 of the pivot concave 60 only via respective entire circumferences of the circumferential positions C1, C2 at the positions P1, P2. In other words, upon the mirror tilting section 14 being tilted, for the abutment positions in the convex surface 129 and the concave surface 131, only the abutment positions in the convex surface 129 move while the abutment positions in the concave surface 131 do not move and remain at the circumferential positions C1, C2. Therefore, compared to the case where the convex surface 129 of the pivot convex 58 and the concave surface 131 of the pivot concave 60 are both spherical surfaces and the entire spherical surfaces abut and slide on each other, it is less likely to be affected by surface accuracy and an operating torque for mirror surface angle adjustment is stabilized. A stable operating torque can be obtained even if an atmosphere temperature changes. Also, between the circumferential positions C1, C2 at which the convex surface 129 and the concave surface 131 are in abutment with each other, a gap 133 is formed continuously around an entire circumference between the convex surface 129 and the concave surface 131. Grease is charged in the gap 133 and the gap 133 thus forms a grease reservoir. The grease in the grease reservoir 133 facilitates smooth sliding of the convex surface 129 and the concave surface 131, enabling mirror surface angle adjustment to be made with a more stable operating torque.

Figure 22:
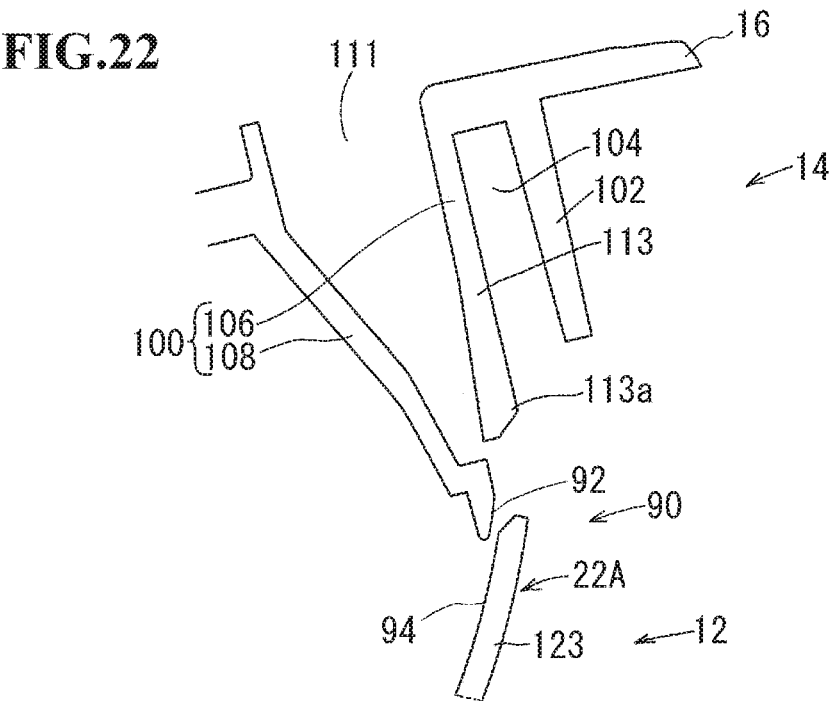
FIGS. 22 to 25 are cross-sectional views illustrating operation of an elastic piece 113, which is illustrated in, e.g., FIGS. 10 and 13, and from among the figures.
Figure 23:
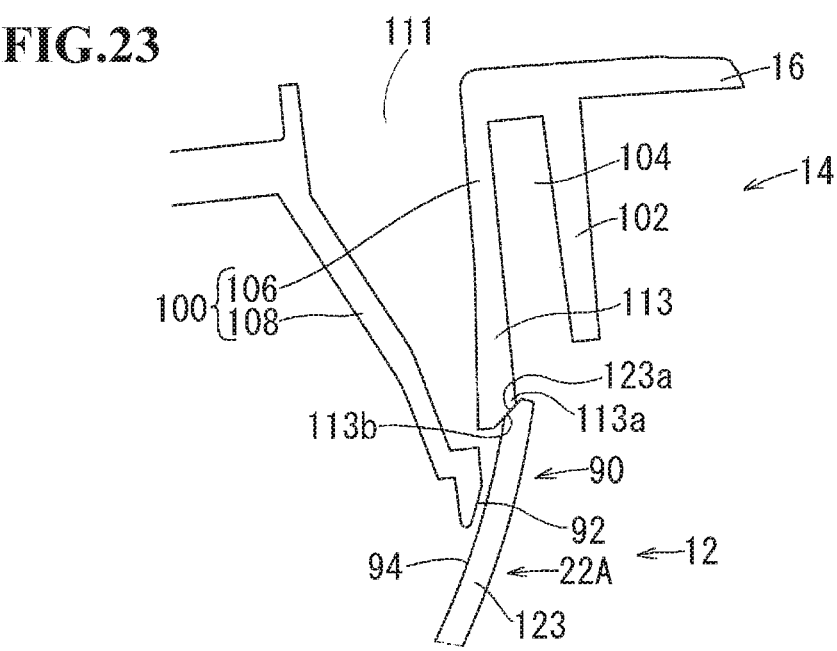
Figure 24:
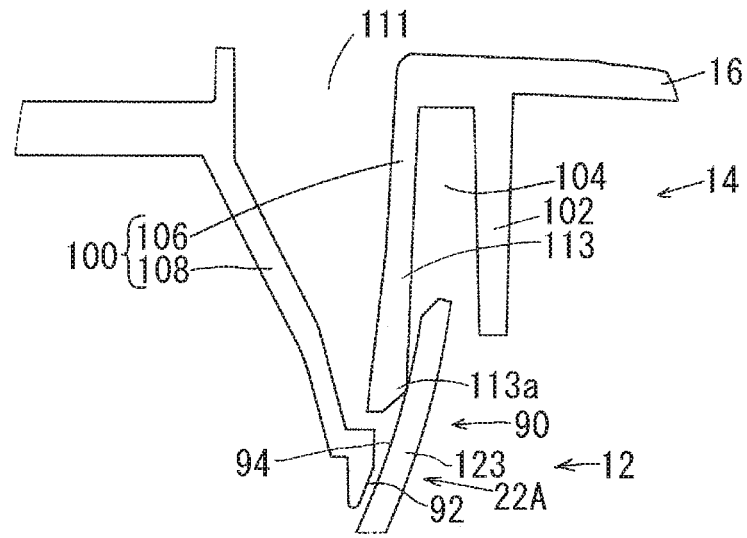
Figure 25:
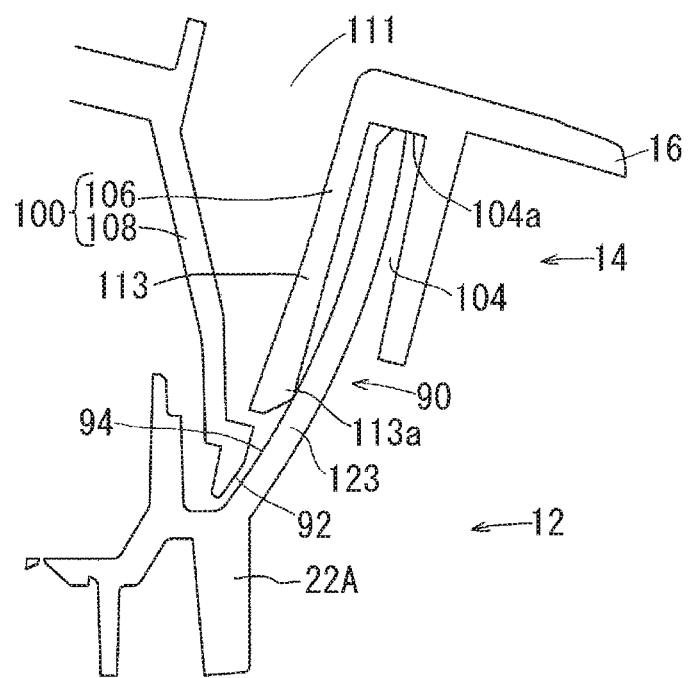

Next, operation of the elastic pieces 113 formed at the outer-pivot convex surface 92 of the outer pivot 90 will be described. FIGS. 22 to 25 illustrate operation of an elastic piece 113 when the mirror tilting section 14 is tilted to a maximum angle position in the right direction in FIG. 7 from a state in which the mirror tilting section 14 is tilted to a maximum angle position in the left direction in FIG. 6 through the neutral position in FIG. 5, sequentially. FIGS. 22 to 25 illustrate a vertical cross-section of the outer pivot 90 at a right end position, taken along a position corresponding to a plane extending through both center axes V, X of the pivot convex 58 and the pivot concave 60 and the protrusions 113a of the elastic pieces 113. First, FIG. 22 illustrates a state in which the mirror tilting section 14 is tilted to the maximum angle position in the left direction. At this time, at the right end position of the outer pivot 90, an end of the outer-pivot convex surface 92 and an end of the outer-pivot concave surface 94 slightly overlap each other, and no large gap is generated between the outer-pivot convex surface 92 and the outer-pivot concave surface 94. Also, the elastic piece 113 at this position is released from abutment with the outer-pivot concave surface 94. Upon the mirror tilting section 14 being tilted in the right direction from this state, an inclined surface 123a of an upper end of the outer-pivot concave surface-forming annular wall 123 of the housing front 22A and an inclined surface 113b of a lower end of the protrusion 113a of the elastic piece 113 are brought into abutment with each other at the position indicated in FIG. 23. Consequently, the inclined surfaces 123a, 113b slide on each other against an elastic force of the elastic piece 113, and the elastic piece 113 withdraws inward, and lastly, the elastic piece 113 enters the inner circumferential side of the outer-pivot concave surface-forming annular wall 123. Upon the elastic piece 113 entering the inner circumferential side of the outer-pivot concave surface-forming annular wall 123, an apex of the protrusion 113a is brought into abutment with the outer-pivot concave surface 94 and slides on the outer-pivot concave surface 94. FIG. 24 illustrates a state in which the mirror tilting section 14 reaches the neutral position in FIG. 5. The apex of the protrusion 113a is in contact with the outer-pivot concave surface 94 by an elastic force of the elastic piece 113 (pressing force of the elastic abutment). Also, an upper portion of the outer-pivot concave surface-forming annular wall 123 of the housing front 22A enters the gap 104 between the outer-pivot convex surface-forming annular wall 100 and the outer auxiliary annular wall 102. Upon the mirror tilting section 14 being further tilted in the right direction from this state, as illustrated in FIG. 25, the upper end of the outer-pivot concave surface-forming annular wall 123 bumps against a far end surface 104a at a deepest part of the inside of the gap 104, whereby the tilting of the mirror tilting section 14 is stopped. At this time, the mirror tilting section 14 is at the maximum angle position in the right direction. In this case, also, the state in which the apex of the protrusion 113a is in contact with the outer-pivot concave surface 94 by the pressing force of the elastic abutment of the elastic piece 113 is maintained.

In this embodiment, the mirror tilting section 14 is designed so as to be capable of tilting at a maximum angle of ±13.5 to 14 degrees in respective directions relative to the neutral position in FIG. 5. If the angle of the tilting of the mirror tilting section 14 is increased, as in FIG. 22, some of the elastic pieces 113 are released from abutment with the outer-pivot concave surface 94 and support via such elastic pieces 113 become ineffective. However, even in such case, at least three remaining elastic pieces 113 abut on the outer-pivot concave surface 94 and can cause the outer-pivot convex surface 92 to be supported by the outer-pivot concave surface 94. In addition, in an actual use in which the present door mirror is installed in a vehicle, most of users use the door mirror at an angle of around ±5 degrees relative to the neutral position. In this case, all of the five elastic pieces 113 abut on the outer-pivot concave surface 94, whereby the outer-pivot convex surface 92 is supported by the outer-pivot concave surface 94 around the entire circumference.

The inner pivot 88 is assembled by forcibly fitting the pivot convex 58 and the pivot concave annular wall 96 circumferentially divided into three by the slits 98, without screw fastening. Therefore, the mirror tilting section 14 has room for slightly moving in the surface direction or the axial direction relative to the tilting support section 12 by means of elastic deformation of the pivot concave annular wall 96.

Thus, the support of the mirror tilting section 14 by the outer pivot 90 is uniformized in the circumferential direction of the outer pivot 90, providing a favorable chatter vibration suppression effect via the outer pivot 90. Also, the outer-pivot concave surface-forming annular wall 123 of the housing front 22A is inserted into the gap 104 between the outer-pivot convex surface-forming annular wall 100 and the outer auxiliary annular wall 102, and thus, entry of, e.g., foreign substances and/or water into the space inside the outer pivot 90 is suppressed. Also, grease is charged and held in the gap 104, enhancing the effect of suppressing entry of, e.g., foreign substances and/or water into the space inside the outer pivot 90. In this case, the outer circumferential surface of the outer-pivot convex surface-forming annular wall 100, to which the grease adheres, is covered by the outer auxiliary annular wall 102, and thus, at the time of assembling the tilting support section 12 and the mirror tilting section 14, the grease adhering to the outer circumferential surface of the outer-pivot convex surface-forming annular wall 100 can be prevented from adhering to the hands of a worker.

Figure 26:
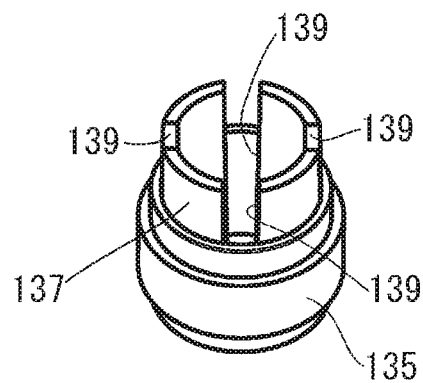
FIG. 26 is a perspective view illustrating a detailed configuration of a worm wheel 32 or 34 in FIG. 1.

Next, detailed configurations of the worm wheels 32, 34 and the adjustment nuts 36, 38 will be described. FIG. 26 illustrates a worm wheel 32 or 34. The worm wheel 32 or 34 is formed as an integrally-molded product of a synthetic resin. A gear (helical gear) 135 to be engaged with a worm 50 or 52 (FIG. 1) is formed at an outer circumferential surface of the lower part of the worm wheel 32 or 34. An inner circumferential-side part of the worm wheel 32 or 34 is extended upward and forms an extension 137. In the inner circumferential-side part of the worm wheel 32 or 34, axially-extending grooves 139 are formed at four positions equally spaced in a circumferential direction (positions equally spaced by 90 degrees). The grooves 139 each form a cutout in the extension 137. The grooves or cutouts 139 are formed continuously from a lower end to an upper end of the worm wheel 32 or 34.

Figure 27:
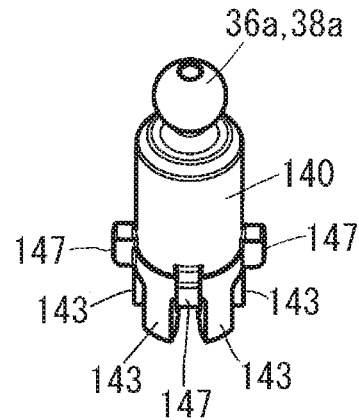
FIG. 27 is a perspective view of a detailed configuration of an adjustment nut 36 or 38 in FIG. 1 as viewed from obliquely above.
Figure 28:
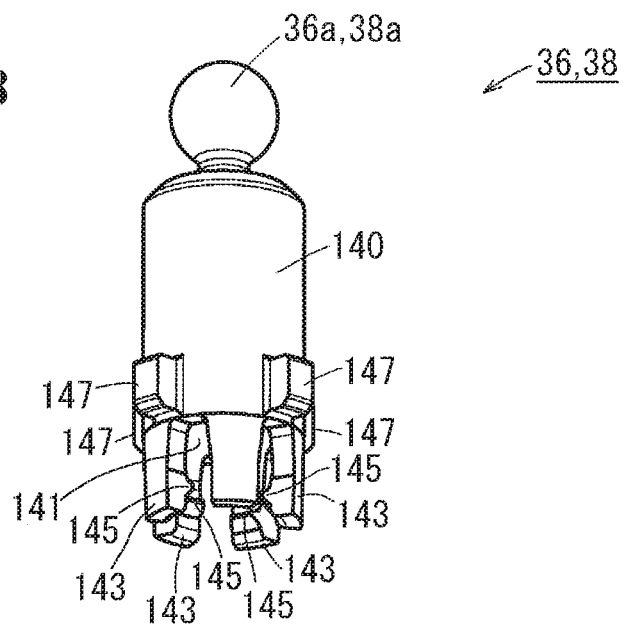
FIG. 28 is a perspective view of the adjustment nut in FIG. 27 as viewed obliquely from below.
Figure 29:
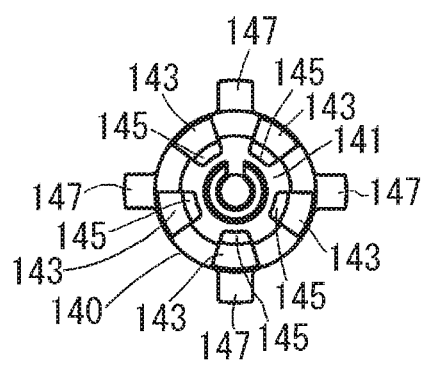
FIG. 29 is a bottom view of the adjustment nut in FIG. 27.

FIGS. 27 to 29 illustrate an enlargement of an adjustment nut 36 or 38. The adjustment nut 36 or 38 is formed of an integrally-molded product of a synthetic resin such as polyacetal (POM). At a front end of the adjustment nut 36 or 38, the convex sphere 36a or 38a to be coupled to a concave sphere 66 or 68 (FIG. 10) of the mirror holder 16 as a spherical joint is formed. A cylindrical barrel 140 is connected to a bottom of the convex sphere 36a or 38a. Five legs 143 are connected to a bottom of the barrel 140. The adjustment nut 36 or 38 has such structure as above. Inside the adjustment nut 36 or 38, a void 141 that allows the male thread member 24 or 26 to be withdrawably inserted thereto is formed. The void 141 opens at a rear end of the adjustment nut 36 or 38. Five legs 143 are disposed at equal intervals (equally spaced by 72 degrees) in a circumferential direction of the adjustment nut 36 or 38. On the inner circumferential surface side of each leg 143, a claw 145 to be threadably connected to a male thread of a male thread member 24 or 26 is formed. At positions in a lower portion of an outer circumferential surface of the barrel 140, immediately above the legs 143, four protrusions 147 are formed so as to protrude outward. The four protrusions 147 are disposed at equal intervals (equally spaced by 90 degrees) in the circumferential direction of the adjustment nut 36 or 38. A length of the protrusions 147 in an axial direction of the adjustment nut 36 or 38 is longer than a length of the protrusions 147 in the circumferential direction of the adjustment nut 36 or 38. In other words, the protrusions 147 are flat in the circumferential direction of the adjustment nut 36 or 38 and elongated in the axial direction of the adjustment nut 36 or 38.

In the tilting support section 12, the claws 145 of the adjustment nut 36 or 38 are threadably connected to the male thread member 24 or 26 of the housing front 22A. The adjustment nut 36 or 38 is received in the space on the inner circumferential side of the worm wheel 32 or 34. The lower part of the worm wheel 32 or 34 is rotatably received and held in the recess 40 or 42 of the housing front 22A. The four protrusions 147 of the adjustment nut 36 or 38 are received in the four grooves or cutouts 139 of the worm wheel 32 or 34 so as to be movable along the grooves or cutouts 139. Consequently, upon the worm wheel 32 or 34 being rotated by motor driving, the adjustment nut 36 or 38 rotates together with the worm wheel 32 or 34 via the engagement between the grooves or cutouts 139 and the protrusion 147. At this time, the claws 145 are threadably connected to the male thread member 24 or 26 of the adjustment nut 36 or 38, and thus, the adjustment nut 36 or 38 rises/falls along the male thread member 24 or 26. At this time, the protrusions 147 move along the respective grooves or cutouts 139.

Figure 30:
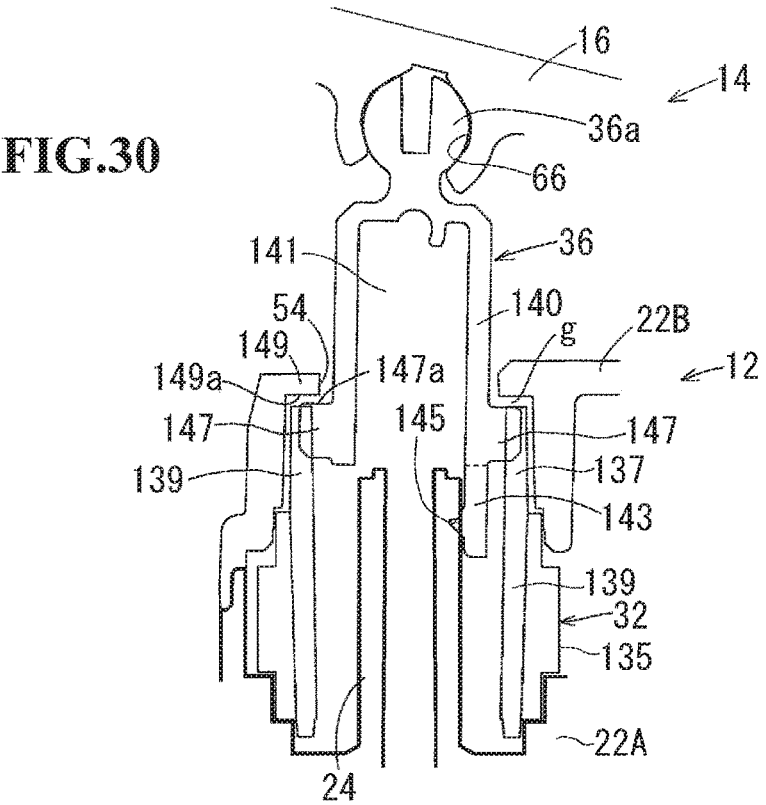
FIG. 30 is an enlarged cross-sectional view of an area around an adjustment nut in the state in FIG. 7 in which the mirror tilting section is tilted to the maximum angle position in the right direction.

FIG. 30 illustrates an adjustment nut 36 in a state in which the mirror tilting section 14 is tilted to the maximum angle position in the right direction (state in FIG. 7). An inner diameter of the opening 54 of the housing rear 22B from which the adjustment nut 36 protrudes is slightly larger than an outer diameter of a barrel 140 of the adjustment nut 36 and is smaller than an outer circumferential diameter of the protrusions 147. A structure part 149 at a circumferential edge of the opening 54 of the housing rear 22B forms a protrusion abutment portion on which the protrusions 147 abut. In a state in which the mirror tilting section 14 is tilted to the maximum angle position in the right direction, as illustrated in FIG. 7 or 25, the upper end of the outer-pivot concave surface-forming annular wall 123 of the housing front 22A bumps against the far end surface 104a at the deepest part of the inside of the gap 104 between the outer-pivot convex surface-forming annular wall 100 and the outer auxiliary annular wall 102, whereby the tilting of the mirror tilting section 14 is stopped. In this case, in FIG. 30, the protrusions 147 of the adjustment nut 36 reach tops of the respective grooves or cutouts 139 of the worm wheel 32, but do not abut on the protrusion abutment portion 149. In other words, there is a small clearance g between the protrusions 147 and the protrusion abutment portion 149. When replacing the mirror tilting section 14 due to, e.g., breakage of the mirror 18, a finger or fingers are inserted under a left end of the mirror tilting section 14 in FIG. 7 to pull the mirror tilting section 14 up from this state. Then, the mirror tilting section 14 pivots clockwise with a position of abutment between the upper end of the outer-pivot concave surface-forming annular wall 123 of the housing front 22A and the far end surface 104a at a right-side position of the mirror tilting section 14 in FIG. 7 as a support point, whereby the inner pivot 88 is about to be released from the spherical joint coupling. With the pivoting of the mirror tilting section 14, the adjustment nut 36 is slightly pulled up. However, in FIG. 30, top surfaces 147a of the protrusions 147 immediately abut on and are locked by a lower surface 149a of the protrusion abutment portion 149, and thus the pull-up of the adjustment nut 36 is stopped. As a result, the spherical joint coupling between the convex sphere 36a of the adjustment nut 36 and the concave sphere 66 is cancelled. Also, the spherical joint coupling between the pivot convex 58 and the pivot concave 60 of the inner pivot 88 is cancelled. Consequently, the mirror tilting section 14 comes off from the tilting support section 12. At this time, the claws 145 of the adjustment nut 36 remain threadably connected to the male thread member 24 on the tilting support section 12 side without coming off from the male thread member 24. When the mirror tilting section 14 is pulled up as described above, the protrusions 147 are locked by the protrusion abutment portion 149, whereby a pull-up force is applied to the protrusions 147. However, the protrusions 147 are joined to the barrel 140 and thus the legs 143 are prevented from being forcibly pressed. Consequently, deformation and/or breakage of the legs 143 can be prevented. Also, the length of the protrusions 147 in the axial direction of each adjustment nut 36 or 38 is longer than the length of the protrusions 147 in the circumferential direction of the adjustment nut 36 or 38. In other words, the protrusions 147 are flat in the circumferential direction of the adjustment nut 36 or 38 and are elongated in the axial direction of the adjustment nut 36 or 38. Therefore, even if the protrusions 147 are locked by the protrusion abutment portion 149 and a pull-up force is thereby applied to the protrusions 147, deformation and/or breakage of the protrusions 147 is prevented because a strength of the protrusion 147 is high relative to the pull-up force.

As described above, the four protrusions 147 are disposed at equal intervals (equally spaced by 90 degrees) in the circumferential direction of the adjustment nut 36 or 38. If the number of protrusions 147 is, for example, two (equally spaced by 180 degrees), when a circumferential edge of the mirror tilting section 14 is pulled obliquely upward for replacement of the mirror tilting section 14, depending on the rotational position of the adjustment nut 36 or 38 relative to the male thread member 24 or 26, none of the protrusions 147 does not abut on the protrusion abutment portion 149 until the adjustment nut 36 or 38 is largely inclined relative to the male thread member 24 or 26. Thus, deformation or breakage of the legs 143 easily occurs. On the other hand, if the protrusions 147 are disposed at equally-spaced four or more positions in the circumferential direction of the adjustment nut 36 or 38, regardless of the rotational positions of the adjustment nut 36 or 38, any of the four or more protrusions 147 abuts on the protrusion abutment portion 149 before the adjustment nut 36 or 38 is largely inclined relative to the male thread member 24 or 26. Therefore, before the adjustment nut 36, 38 is largely inclined, the spherical joint coupling between the convex sphere 36a or 38a of the adjustment nut 36 or 38 and the concave sphere 66 or 68 is cancelled, and thus, the adjustment nut 36 or 38 can be removed from the mirror tilting section 14, preventing deformation and/or breakage of the legs 143.

By the way, in case the protrusions 147 have both a function that prevents rotation relative to the worm wheel 32 and a function that prevents the adjustment nut 36 from coming off from the male thread member 24, a travel distance of the adjustment nut 36 is limited by the coming-off prevention function. As a result, a mirror surface angle adjustment range (swing angle) is narrowed. As a countermeasure therefor, in this embodiment, as can easily be understood from FIG. 30, with the protrusions 147 abutting on the protrusion abutment portion 149, the protrusions 147 are disposed at respective positions above the top of the male thread member 24. Consequently, compared to the case where with the protrusions 147 abutting on the protrusion abutment portion 149, the protrusions 147 are disposed at positions not above the top of the male thread member 24, the travel distance until the protrusions 147 abut on the protrusion abutment portion 149 is long. As a result, decrease of the mirror surface angle adjustment range is suppressed. Also, the protrusions 147 are disposed at positions of a height immediately above the legs 143 in the lower portion of the barrel 140. Consequently, compared to the case where the protrusions 147 are disposed at higher positions in the barrel 140, the travel distance until the protrusions 147 abut on the protrusion abutment portion 149 is long. Consequently, also, decrease of the mirror surface angle adjustment range is suppressed. Also, since the protrusion abutment portion 149 is formed in the housing rear 22B, compared to the case where the protrusion abutment portion 149 is formed in the worm wheel 32 received in the actuator housing 22, the travel distance until the protrusions 147 abut the protrusion abutment portion 149 is long. Consequently, also, decrease of the mirror surface angle range is suppressed.

Although the coming-off prevention configuration and the coming-off prevention operation on the adjustment nut 36 side has been described above, a coming-off prevention configuration and coming-off prevention operation on the adjustment nut 38 side are similar to those of the adjustment nut 36 side. Also, when the mirror tilting section 14 is tilted in an upper direction to a maximum angle position, the adjustment nut 38 enters a state that is similar to that in FIG. 30.

Figure 31:
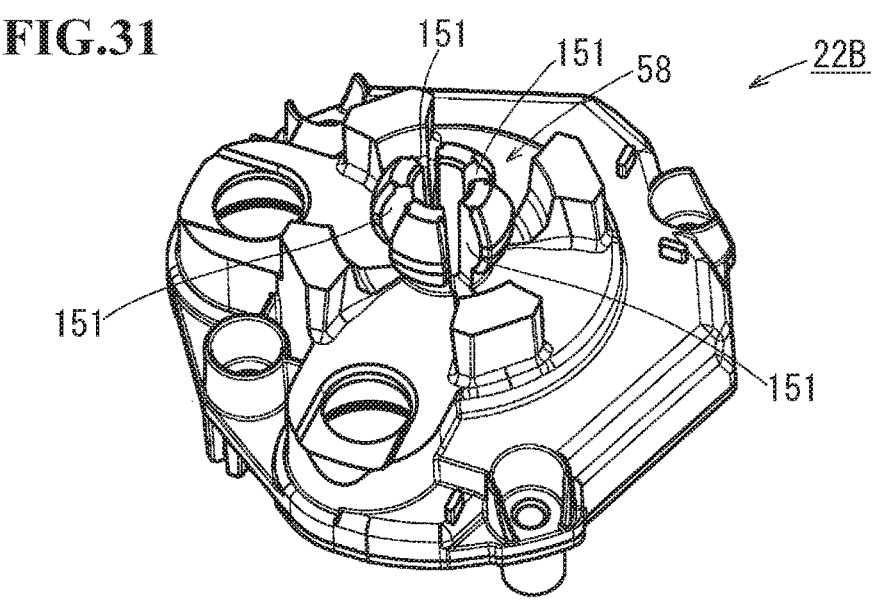
FIG. 31 is a perspective view of a modification of the pivot convex 58 of the housing rear 22B in FIG. 1, instead of the structure in FIG. 16, as viewed from the front side.

Also, in the pivot convex 58, slits 151, which are illustrated in FIG. 31, can be formed instead of the grooves 125 illustrated in FIG. 16. In this case, the slits 151 make the pivot convex 58 easily elastically deform. Therefore, in conjunction with the slits 98 making the pivot concave annular wall 96 easily elastically deform, the pivot convex 58 can be held in the pivot concave 60 with much less backlash, in a state in which the pivot convex 58 is forcibly fitted in the pivot concave 60. In the forcibly-fitted state, the pivot concave annular wall 96 catches the pivot convex 58 by means of an elastic force of the pivot concave annular wall 96. Also, the pivot convex 58 pushes and expands the pivot concave annular wall 96 by means of an elastic force of the pivot convex 58. Therefore, the pivot concave annular wall 96 and the pivot convex 58 provide a predetermined pressing force to each other. Since both the pivot convex 58 and the pivot concave annular wall 96 easily elastically deform, the support of the mirror tilting section 14 by the outer pivot 90 is more uniformized in the circumferential direction of the outer pivot 90. Consequently, the chatter vibration suppression effect provided by the outer pivot 90 is more enhanced. The slits 151 may be provided only on the pivot convex 58 side while no slits 98 are provided in the pivot concave annular wall 96. In this case, in the forcibly fitted state, the pivot convex 58 pushes and expands the pivot concave annular wall 96 by means of the elastic force of the pivot convex 58, and thus provides a predetermined pressing force to the pivot concave 60.

Although in the above embodiment, the elastic pieces are disposed at the outer-pivot convex surface, the elastic pieces may be disposed at the outer-pivot concave surface or are disposed at positions in the outer-pivot convex surface and the outer-pivot concave surface, the positions not interfering with each other. Although in the above embodiment, the elastic pieces are formed in a cantilever-supported manner, the elastic pieces according to this invention are not limited to those having such structure. The above embodiment has been described in terms of the case where this invention is applied to a tilting device including a mirror tilting section configured by a mirror being held by a mirror holder. However, this invention is applicable also to a tilting device including a mirror tilting section configured by a mirror holder holding a mirror being held by a component called, e.g., a plate pivot, like the tilting devices described in Japanese Patent Laid-Open Nos. 2014-159221 and 2014-159222 according to patent applications filed by the present applicant. Although the above embodiment has been described in terms of the case where this invention is applied to a motor-driven, remote control-type mirror surface angle adjustment mechanism, this invention is applicable also to a manual-type (e.g., a type in which a mirror surface is manipulated directly with hands, a wire-manipulation remote control type or a lever-manipulation remote control type) mirror surface angle adjustment mechanism. Although the above embodiment has been described in terms of the case where this invention is applied to a view angle adjustment mechanism in which a view element is a mirror, this invention is applicable also to a view angle adjustment mechanism in which a view element is a camera (e.g., a vehicle-mounted camera) or another view element. Although the above embodiment has been described in terms of the case where this invention is applied to an outer mirror for an automobile, this invention is applicable also to an inner mirror for an automobile. Also, this invention is applicable also to a mirror device or any of other view devices for use other than an automobile. In this invention, which of a convex shape and a concave shape of a pivot is disposed on the view element tilting section side and which of the convex shape and the concave shape is disposed on the tilting support section side can arbitrarily be selected.

What is claimed is:

1. A view angle adjustment mechanism in a view device, the view angle adjustment mechanism being configured to support a view element tilting section holding a view element by a tilting support section via at least two concentric pivots having different diameters, the pivots including an inner pivot and an outer pivot, so as to be capable of adjusting a view angle of the view element, wherein:

the inner pivot is assembled by forcible fitting using elasticity of either or both of a pivot convex and a pivot concave without screw fastening;

the outer pivot includes a plurality of elastic pieces disposed at a plurality of positions in a circumferential direction of a curved surface provided on an annular wall of either or each of an outer-pivot convex surface and an outer-pivot concave surface, the annular wall having a plurality of openings formed therein, wherein a continuous annular rim of the annular wall, provided proximate free ends of the plurality of elastic pieces, delimits the plurality of openings, and wherein the annular wall includes circumferentially extending arcuate wall surfaces, wherein each of the circumferentially extending arcuate wall surfaces extends circumferentially between adjacent ones of the plurality of openings, and wherein the continuous annular rim is formed integral with the circumferentially extending arcuate wall surfaces;

the outer pivot is assembled by the forcible fitting in the inner pivot and the plurality of elastic pieces elastically abut on an opposed curved surface; and wherein each of the plurality of elastic pieces are positioned within a corresponding one of the plurality of openings and is configured to deflect in a direction opposite the opposed curved surface upon abutting the opposed curved surface, wherein each of the plurality of elastic pieces are enclosed by the corresponding one of the plurality of openings.

2. The view angle adjustment mechanism according to claim 1, wherein the elastic pieces are formed in a cantilever-supported manner by cutting the curved surface of either or each of the outer-pivot convex surface and the outer-pivot concave surface.

3. The view angle adjustment mechanism according to claim 1, wherein the elastic pieces are disposed at five or more positions equally spaced in the circumferential direction of the curved surface at which the elastic pieces are disposed.

4. The view angle adjustment mechanism according to claim 1, wherein each of the elastic pieces includes a protrusion protruding toward the opposed curved surface and abuts on the opposed curved surface via the protrusion.

5. The view angle adjustment mechanism according to claim 1, wherein at least one of the pivot convex and the pivot concave is circumferentially divided by a slit formed in an axial direction in at least one of the pivot convex and the pivot concave.

* * * * *